(12) United States Patent
Fukuhara et al.

(10) Patent No.: US 8,279,932 B2
(45) Date of Patent: Oct. 2, 2012

(54) INFORMATION PROCESSING APPARATUS AND METHOD

(75) Inventors: Takahiro Fukuhara, Kanagawa (JP); Katsutoshi Ando, Kanagawa (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 403 days.

(21) Appl. No.: 12/712,597

(22) Filed: Feb. 25, 2010

(65) Prior Publication Data
US 2010/0254460 A1  Oct. 7, 2010

(30) Foreign Application Priority Data

Apr. 7, 2009 (JP) ................... 2009-092613

(51) Int. Cl.
*H04B 1/66* (2006.01)
(52) U.S. Cl. ......... 375/240.16; 375/240.29; 375/240.25; 375/240.2; 375/240.24; 382/235; 382/233; 382/265; 382/263; 382/264; 382/247; 382/260
(58) Field of Classification Search ............. 375/240.16, 375/240.29, 240.25, 240.26, 240.24; 382/235, 382/233, 265, 263, 264, 247, 260
See application file for complete search history.

(56) References Cited

U.S. PATENT DOCUMENTS

| | | | |
|---|---|---|---|
| 6,539,056 B1 | 3/2003 | Sato et al. | |
| 6,546,143 B1 * | 4/2003 | Taubman et al. | 382/240 |
| 7,113,645 B2 * | 9/2006 | Sano et al. | 382/240 |
| 7,197,191 B2 * | 3/2007 | Okada et al. | 382/240 |
| 7,302,104 B2 * | 11/2007 | Suino | 382/240 |
| 7,778,473 B2 * | 8/2010 | Kodama | 382/232 |
| 2007/0116125 A1 * | 5/2007 | Wada et al. | 375/240.16 |

FOREIGN PATENT DOCUMENTS

| | | |
|---|---|---|
| JP | 4016166 | 9/2007 |
| JP | 4026238 | 10/2007 |

OTHER PUBLICATIONS

U.A. Appl. No. 12/605,774, filed Oct. 26, 2009, Fukuhara, et al.

* cited by examiner

*Primary Examiner* — Shawn An
(74) *Attorney, Agent, or Firm* — Oblon, Spivak, McClelland, Maier & Neustadt, L.L.P.

(57) ABSTRACT

An information processing apparatus includes: a synthesis filter unit configured to execute synthesis filtering for coefficient data of each subband, obtained by decoding a code stream of a reversibly-encoded image and performing band division, in each predetermined number of lines or in each predetermined block to obtain baseband image data on a line basis; a storage unit configured to store the baseband image data obtained by the synthesis filter unit; an analysis filter unit configured to read the baseband image data stored in the storage unit and execute analysis filtering for the image data to divide the image data up to a predetermined division level; and a control unit configured to control the analysis filter unit to execute analysis filtering as soon as the amount of the baseband image data stored in the storage unit reaches a data amount allowing analysis filtering.

13 Claims, 33 Drawing Sheets

DIVISION LEVEL = 3
(H: HIGH FREQUENCY,
L: LOW FREQUENCY)

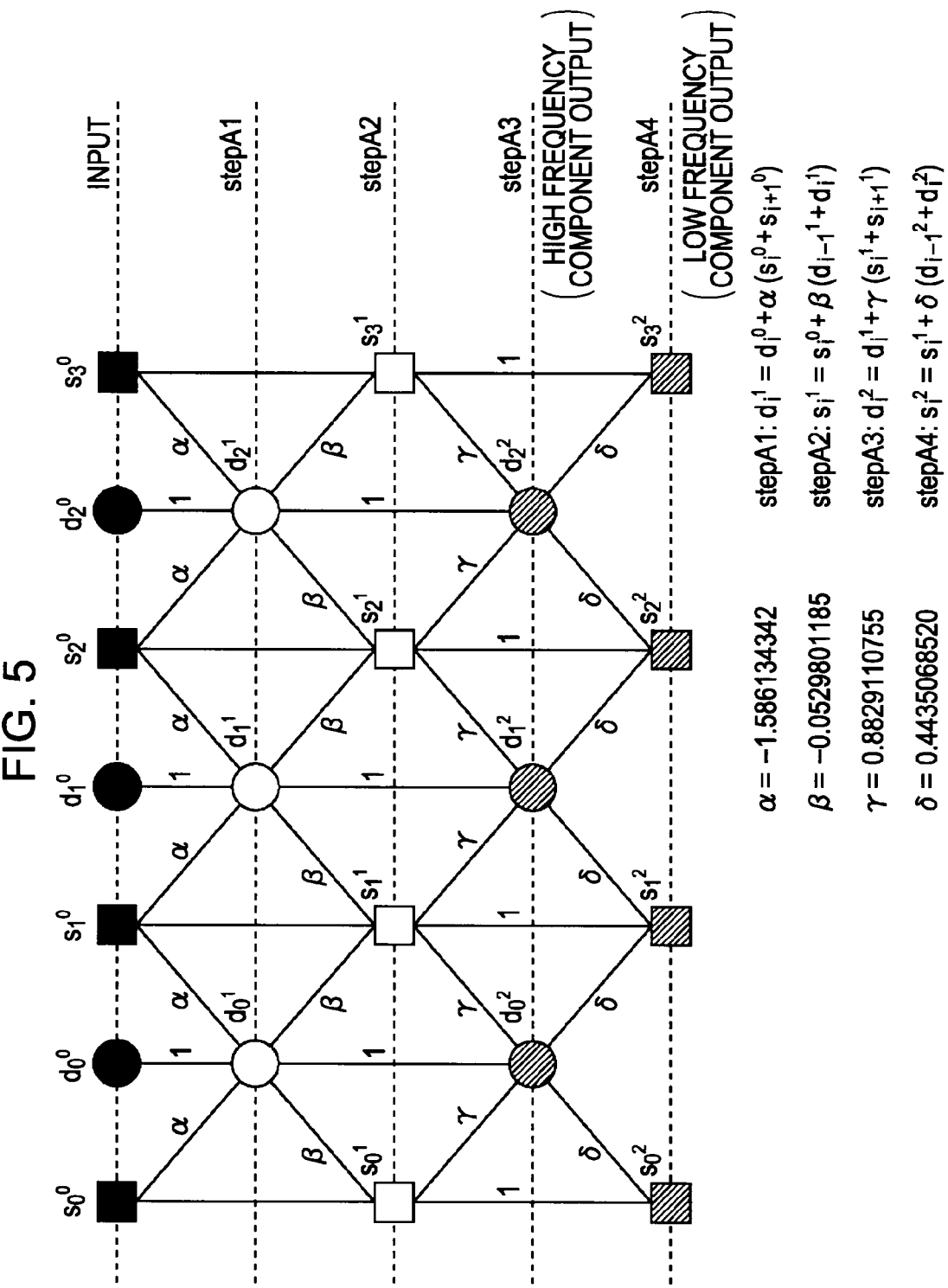

CODE BLOCK
(e.g., 64×64)

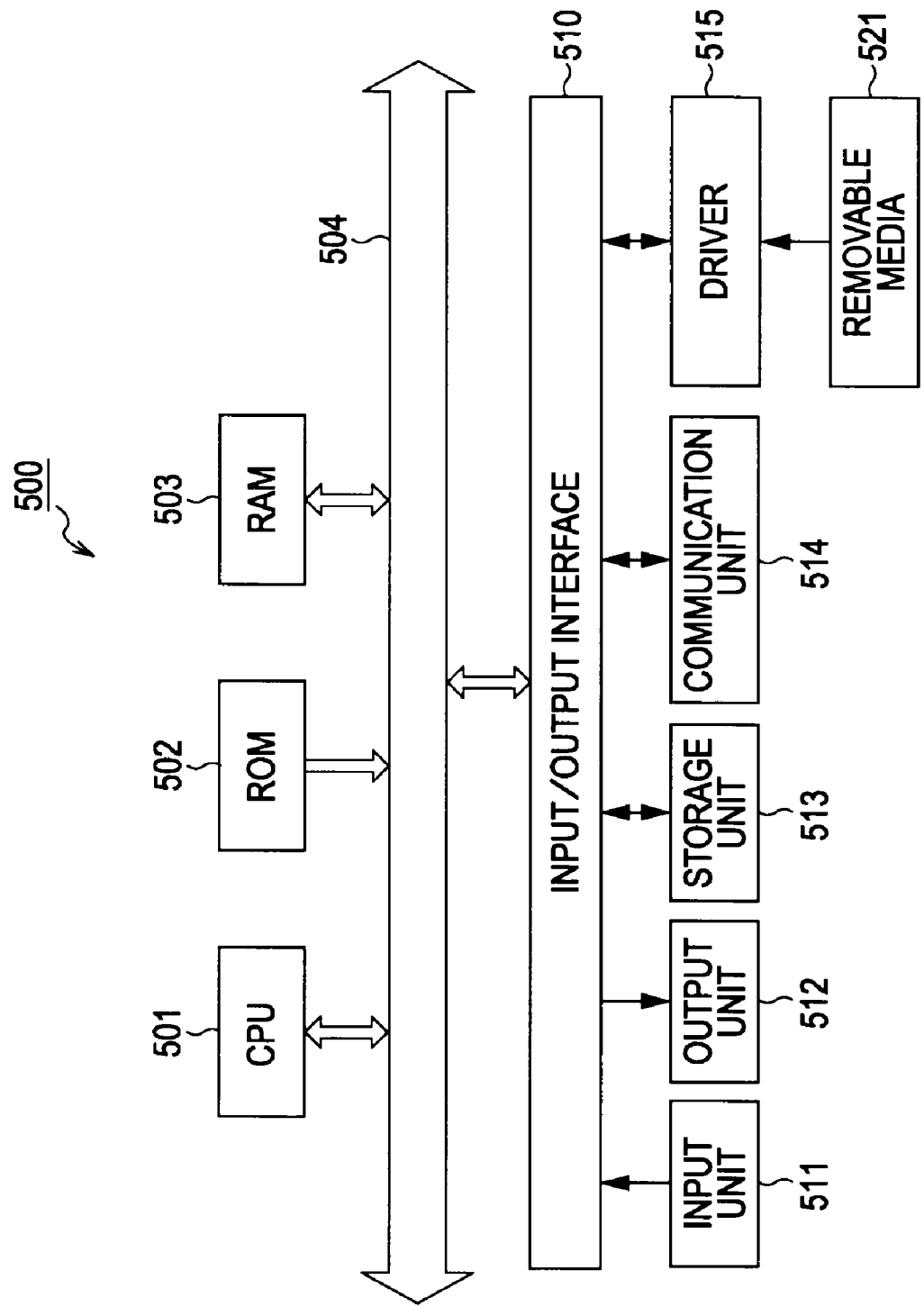

INFORMATION PROCESSING APPARATUS AND METHOD

BACKGROUND OF THE INVENTION

1. Field of the Invention

The present invention relates to an information processing apparatus and method, and particularly, to an information processing apparatus and method capable of reducing the memory capacity demanded when a reversibly-encoded code stream is transformed to an irreversibly-encoded code stream.

2. Description of the Related Art

In the related art, digital image data are used in a variety of fields such as film production, medical services, or still image capturing. Generally, such digital image data are processed by setting uncompressed image data as master images, compressing the uncompressed image data as necessary, and delivering the compressed file via a network or writing the compressed file to a recording medium.

For example, in the field of the digital cinema, the DCI (Digital Cinema Initiatives) standard specifies a compression format for delivering a film. In this format, the ISO (International Organization for Standardization) standard, JPEG2000 (Joint Photographic Experts Group 2000), Part-1 which is an irreversible compression encoding scheme is employed as a compression/decompression technology, of which the bit rate is 250 Mbps as a peak rate for a moving picture sequence of 4096×2160 pixels at XYZ12 bits (24 Hz). That is, uncompressed master images are compressed and then delivered or screened.

Since the master image having a large data size is inconvenient to store, the master image is usually stored by reducing the data amount without data loss using a reversible compression.

For example, the image resolution specified in the DCI standard is 4096×2160 pixels, four times of the HDTV (High Definition Television). Therefore, since the data amount of the uncompressed image data is larger, in practice, the master image is usually stored as a reversible compression file which is encoded using a reversible compression.

In this case, such a reversible compression file is transformed to a JPEG2000 file of the DCI standard in which the file is compressed using an irreversible compression scheme. However, in the JPEG2000 standard, a wavelet transform filter is different between a reversible compression encoding scheme and an irreversible compression encoding scheme. Therefore, during this transform, it may be necessary to restore the baseband image once.

A typical transcoder for executing this process decodes all of the code streams of the reversible compression file to restore the baseband image having the same data size as that of the original baseband master image.

Meanwhile, a downdecoder was proposed which executes an inverse discrete cosine transform using only the coefficient for a low-frequency component in a DCT block of bit streams of a high resolution image to decode the high resolution image into a standard resolution image (e.g., refer to Japanese Patent Nos. 4016166 and 4026238).

SUMMARY OF THE INVENTION

However, in the aforementioned transform process using the transcoder of the related art, all the code streams are decoded. Therefore, if the data amount of the master image is large as described above, a processing load of the decoding may be increased.

While the decoding method which uses the downdecoder as described in Japanese Patent Nos. 4016166 and 4026238 may be considered, it may be not applicable to the aforementioned film production in which the data are transformed without changing the resolution because only the coefficient of the low-frequency component is decoded and the resolution is degraded inevitably.

In this regard, it is desirable to transform the reversibly-encoded code stream to an irreversibly-encoded code stream and reduce the memory capacity demanded during the transform.

According to an embodiment of the present invention, there is provided an information processing apparatus including: a synthesis filter unit configured to execute synthesis filtering for coefficient data of each subband, obtained by decoding a code stream of a reversibly-encoded image and performing band division, in each predetermined number of lines or in each predetermined block to obtain baseband image data on a line basis; a storage unit configured to store the baseband image data obtained by the synthesis filter unit; an analysis filter unit configured to read the baseband image data stored in the storage unit and execute analysis filtering for the band of the image data to divide the image data up to a predetermined division level; and a control unit configured to control the analysis filter unit to execute the analysis filtering as soon as the amount of the baseband image data stored in the storage unit reaches a data amount allowing the analysis filtering.

The information processing apparatus may further including: a decoding unit configured to decode a code stream of a reversibly-encoded image; and an encoding unit configured to encode coefficient data of each subband obtained by the analysis filtering and band division.

The predetermined number of lines which is processing unit of the synthesis filtering may be necessary to generate at least one line of the baseband image data obtained by the synthesis filter unit.

The data amount allowing the analysis filtering may be a number of lines demanded for generating at least one or more lines of a lowest frequency subband of the coefficient data obtained by the analysis filtering and the band division.

The synthesis filter unit may perform synthesis filtering first in the horizontal direction for the coefficient data of each subband and then perform synthesis filtering in the vertical direction. The analysis filter unit may perform analysis filtering first in the horizontal direction for the coefficient data of each subband and then perform analysis filtering in the vertical direction.

The synthesis filter unit may perform synthesis filtering first in the vertical direction for the coefficient data of each subband and then perform synthesis filtering in the horizontal direction. The analysis filter unit may perform analysis filtering first in the vertical direction for the coefficient data of each subband and then perform analysis filtering in the horizontal direction.

The decoding unit may decode the code stream using a JPEG2000 decoding scheme, and the encoding unit may encode the coefficient data using a JPEG2000 encoding scheme.

The information processing apparatus may further include a defining unit configured to define the processing unit of synthesis filtering by the synthesis filter unit.

The defining unit may define the processing unit of synthesis filtering based on at least one of a compression rate of the encoding by the encoding unit or a capacity of the storage unit.

The information processing apparatus may further include a block defining unit configured to define the size of a block which is processing unit of the encoding by the encoding unit and a precinct defining unit configured to define the size of a precinct including a plurality of the blocks of which the size is defined by the block defining unit.

An area where a line group which is a processing unit of the synthesis filtering is ranged out of the precinct defined by the precinct defining unit may be stuffed as soon as subsequent data of the line group are obtained.

According to another embodiment of the invention, there is provided an information processing method including the steps of: executing synthesis filtering for coefficient data of each subband, obtained by decoding a code stream of a reversibly-encoded image and performing band division, in each predetermined number of lines or in each predetermined block to obtain baseband image data on a line basis; storing the baseband image data obtained by the synthesis filter unit; reading the baseband image data stored in the storage unit and executing analysis filtering for the image data to divide the band of the image data up to a predetermined division level; and controlling the analysis filter unit to execute the analysis filtering as soon as the amount of the baseband image data stored in the storage unit reaches a data amount allowing the analysis filtering.

According to the embodiments of the present invention, it is possible to more readily and appropriately generate the irreversibly-encoded code stream. Particularly, it is possible to reduce the memory capacity demanded for transforming the reversibly-encoded code stream to an irreversibly-encoded code stream.

BRIEF DESCRIPTION OF THE DRAWINGS

FIG. 5 illustrates an example of a 9×7 analysis filter.

FIG. 33 is a block diagram illustrating an exemplary configuration of a personal computer according to an embodiment of the invention.

DESCRIPTION OF THE PREFERRED EMBODIMENTS

Hereinafter, embodiments of the present invention will be described in the following sequence.

1. A first embodiment relating to a line-based transcoding control process.

2. A second embodiment relating to a transcoding control process based on the JPEG200 encoding scheme.

1. First Embodiment

Configuration of Encoding Device

First, an image data transform process for transforming a reversibly-encoded code stream to an irreversibly-encoded code stream will be described.

Figure 1:
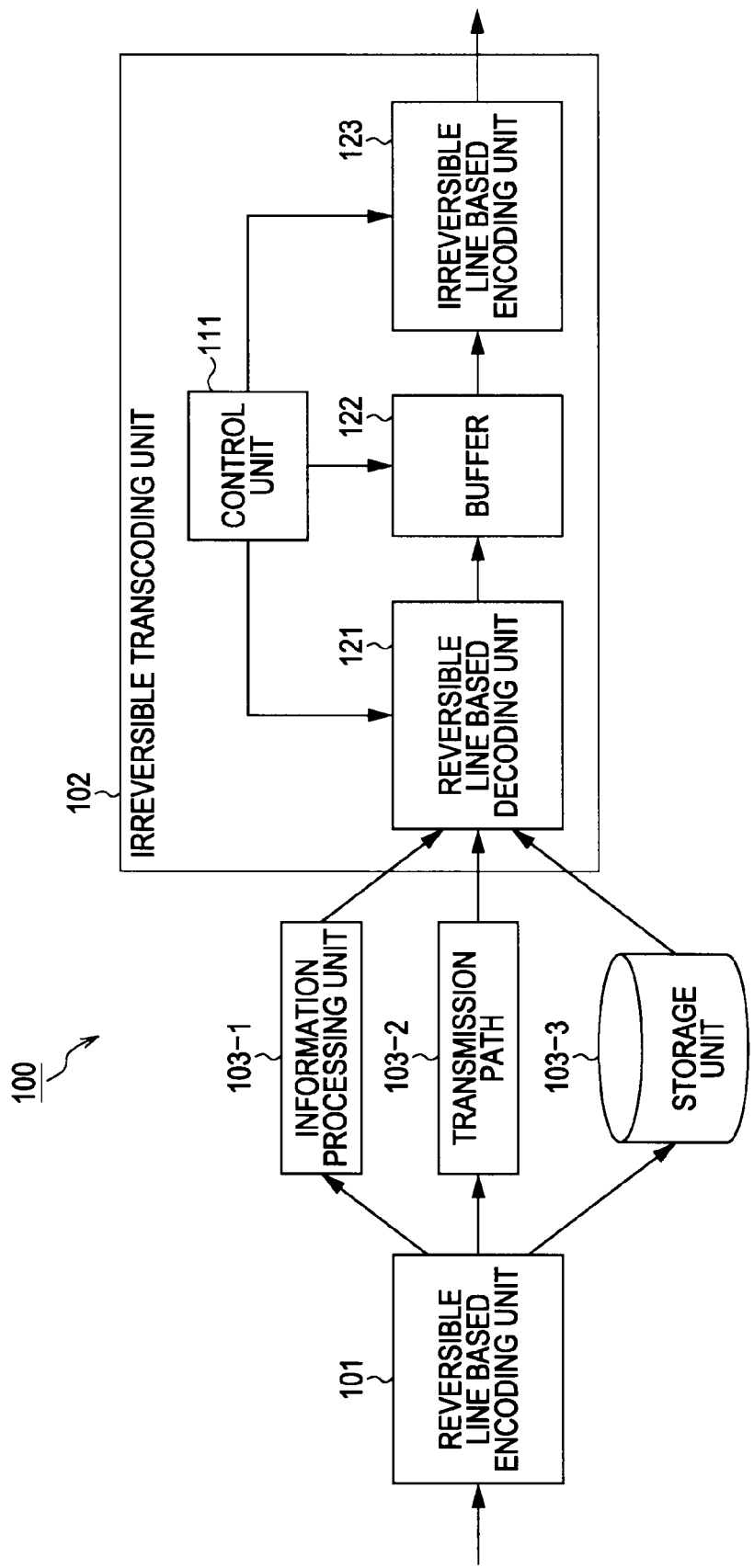
FIG. 1 is a block diagram illustrating an exemplary main configuration of an encoding device according an embodiment of the invention.

FIG. 1 illustrates an exemplary configuration of an encoding device using such a transform process according to an embodiment of the invention. The encoding device 100 shown in FIG. 1 encodes input baseband image data with a predetermined compression rate using a reversible encoding scheme and then transforms the encoded code stream with a desired compression rate to output it as an irreversibly-encoded code stream.

Referring to FIG. 1, the encoding device 100 includes a reversible line-based encoding unit 101 and an irreversible transcoding unit 102.

The reversible line-based encoding unit 101 encodes the input baseband image data (i.e., the master image) with a predetermined compression rate using a predetermined reversible encoding scheme to transform the input baseband image data to a reversible compression file having code streams with a small data size in order to reduce a processing load within the device. In this regard, the reversible line-based encoding unit 101 executes a line-based wavelet transform in which the wavelet transform is performed for the image data in each predetermined number of lines during the encoding. The reversible line-based encoding unit 101 will be described in detail later.

For example, the encoding device 100 executes a predetermined process such as adding meta-information to the reversible compression file in the information processing unit 103-1. Further, for example, the encoding device 100 transmits the reversible compression file via a transmission path 103-2 such as a predetermined bus or network. Further, for example, the encoding device 100 first stores the reversible compression file in a storage unit 103-3 such as a hard disk or semiconductor memory and then reads the reversible compression file at a predetermined timing.

The encoding device 100 transforms this code stream to a code stream encoded with a predetermined irreversible encoding scheme in the irreversible transcoding unit 102. The irreversible transcoding unit 102 has a control unit 111, a reversible line-based decoding unit 121, a buffer 122, and an irreversible line-based encoding unit 123.

The reversible line-based decoding unit 121 is controlled by the control unit 111 to decode a part or all of the code streams of the reversible compression file processed by in the information processing unit 103-1, the reversible compression file supplied through the transmission path 103-2, or the reversible compression file read from the storage unit 103-3 to generate baseband image data.

The reversible line-based decoding unit 121 is controlled by the control unit 111 to supply the generated baseband image data to the buffer 122 where they are stored.

The irreversible line-based encoding unit 123 is controlled by the control unit 111 to obtain the baseband image data from the buffer 122 and encode the baseband image data with a desired compression rate using a predetermined irreversible encoding scheme to output the obtained code streams.

In this case, the control unit 111 obtains the data amount of the baseband image data demanded to achieve a target code amount of the code stream generated by the irreversible line-based encoding unit 123, calculates a compression rate for the image data of the master image (the original image) of that baseband image data, and supplies the compression rate to the reversible line-based decoding unit 121 as a target compression rate. In other words, the control unit 111 expresses the code amount of the baseband image data demanded to achieve the target code amount as the compression rate for the image data of the master image (the original image) and supplies it to the reversible line-based decoding unit 121.

The irreversible line-based decoding unit 121 decodes a part or all of the code streams of the reversible compression file by using that compression rate as a target compression rate to generate the baseband image data. As will be described later, the reversible line-based decoding unit 121 may decode a smaller part of the code streams as the code amount of the baseband image data to be generated is smaller, i.e., as the compression rate for the image data of the master image (the original image) is higher. Therefore, it is possible to reduce the processing amount of the decoding process. However, if the code amount of the baseband image data generated by the reversible line-based decoding unit 121 is too small, there is concern that the irreversible line-based encoding unit 123 may be unable to achieve the target code amount.

In this regard, the control unit 111 allows the reversible line-based decoding unit 121 to select the part to be decoded and executes the decoding process only for the selected part so as to make the compression rate for the image data of the master image (the original image) of the baseband image data generated by the reversible line-based decoding unit 121 be equal to or a little smaller than the target compression rate of the irreversible line-based encoding unit 123.

In other words, the control unit 111 controls the reversible line-based decoding unit 121 to partially decode the code streams of the reversible compression file in order to more significantly reduce the processing amount of the decoding process as long as the irreversible line-based encoding unit 123 can achieve the target code amount.

Hereinafter, such a process of decoding a part of the code streams is referred to as a partial decoding process. Through the partial decoding process described above, the reversible line-based decoding unit 121 can readily and appropriately decode the reversible compression file even when the data size of the master image (the original image) is large.

Each of the reversible line-based encoding unit 101, the reversible line-based decoding unit 121, and the irreversible line-based encoding unit 123 executes a line-based wavelet transform for the image data or an inverse line-based wavelet transform for the code stream. That is, in this processing unit, the wavelet transform or the inverse wavelet transform is performed for each line block obtained by dividing a single picture by a plurality of lines. Therefore, the encoding device 100 can reduce the number of wavelet coefficients stored at a single time in comparison with a case where the wavelet transform is performed for each picture, and more reduce the memory capacity demanded in the buffer 122 or the like.

The control unit 111 of the irreversible transcoding unit 102 controls the irreversible line-based encoding unit 123 to encode the image data output from the reversible line-based decoding unit 121 as much as only the amount that can be encoded by the irreversible line-based encoding unit 123 as soon as they are accumulated in the buffer 122. Through such a control process, the encoding device 100 can more significantly reduce the memory capacity demanded in the buffer 122.

The reversible line-based decoding unit 121 and the irreversible line-based encoding unit 123 will be described in more detail later.

Configuration of Reversible Encoding Unit

Figure 2:
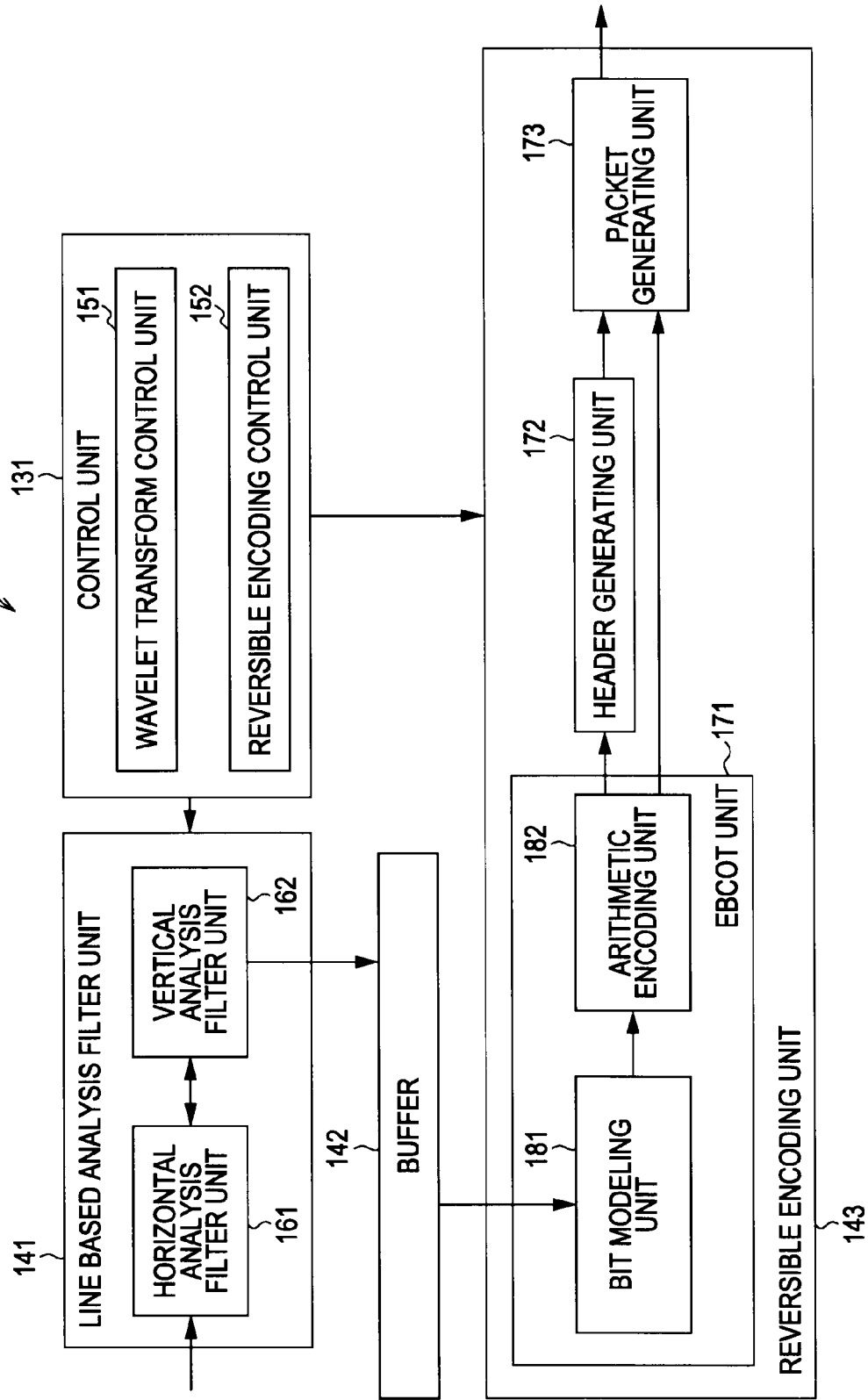
FIG. 2 is a block diagram illustrating an exemplary configuration of a reversible line-based encoding unit.

Next, a configuration of the encoding device 100 shown in FIG. 1 will be described in detail. FIG. 2 is a block diagram illustrating an exemplary configuration of the reversible line-based encoding unit 101 of FIG. 1 in detail. Referring to FIG. 2, the reversible line-based encoding unit 101 has a control unit 131, a line-based analysis filter 141, a buffer 142, and a reversible encoding unit 143.

The control unit 131 has a wavelet transform control unit 151 which controls the operation of the line-based analysis filter unit 141 and a reversible encoding control unit 152 which controls the operation of the reversible encoding unit 143.

The line-based analysis filter unit 141 is controlled by the wavelet transform control unit 151 to perform line-based wavelet transform which recursively iterates an analysis filter process for the input image data, in which the coefficients are divided into high-frequency components and low-frequency components in each line block having a predetermined number of lines.

Figure 3:
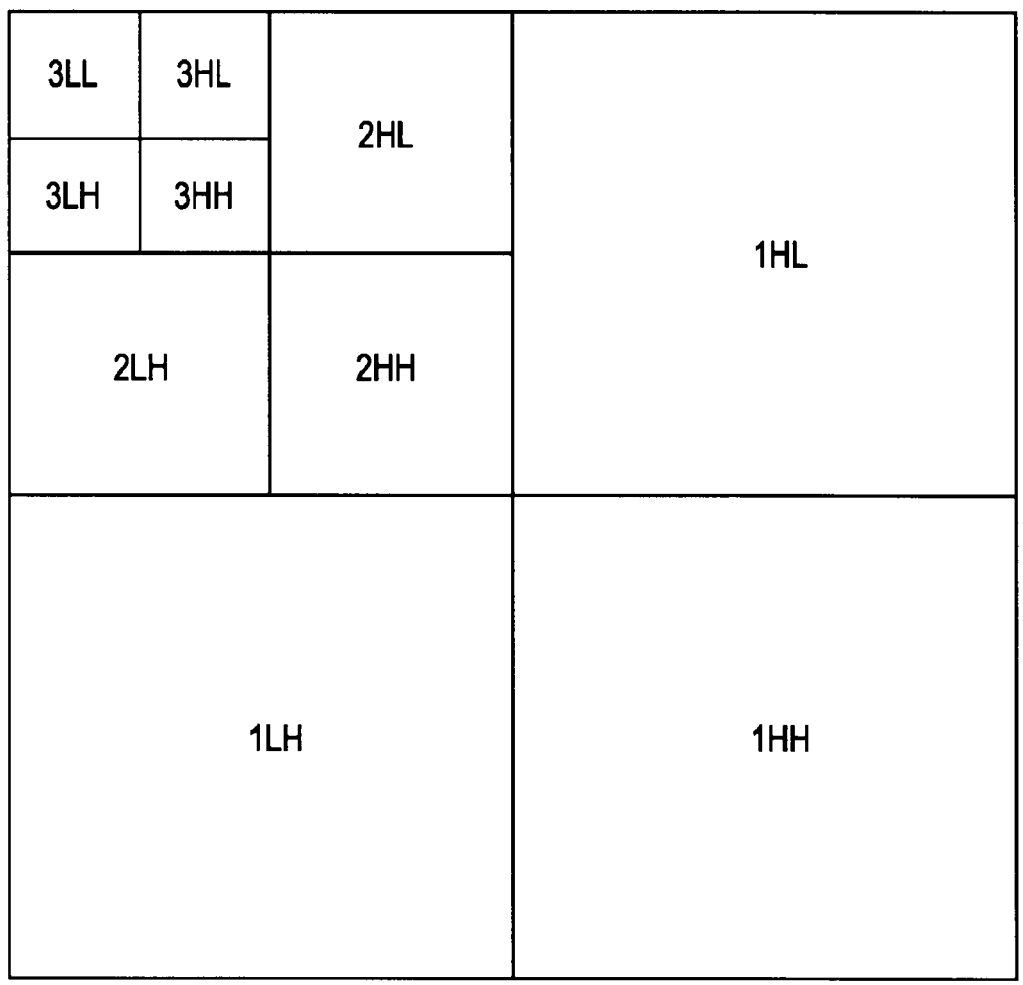
FIG. 3 illustrates an example of a subband.

FIG. 3 illustrates an exemplary configuration of subbands generated by the wavelet transform process having a division level number of 3. In this case, analysis filtering is performed for the baseband image data in both horizontal and vertical directions to generate subbands 1LL (not shown), 1HL, 1LH, and 1HH. Subsequently, analysis filtering is performed again for the subband 1LL in both horizontal and vertical directions to generate subbands 2LL (not shown), 2HL, 2LH, and 2HH. Further, the analysis filtering is performed again in both horizontal and vertical directions for the generated subband 2LL to generate subbands 3LL, 3HL, 3LH, and 3HH.

Figure 4B:
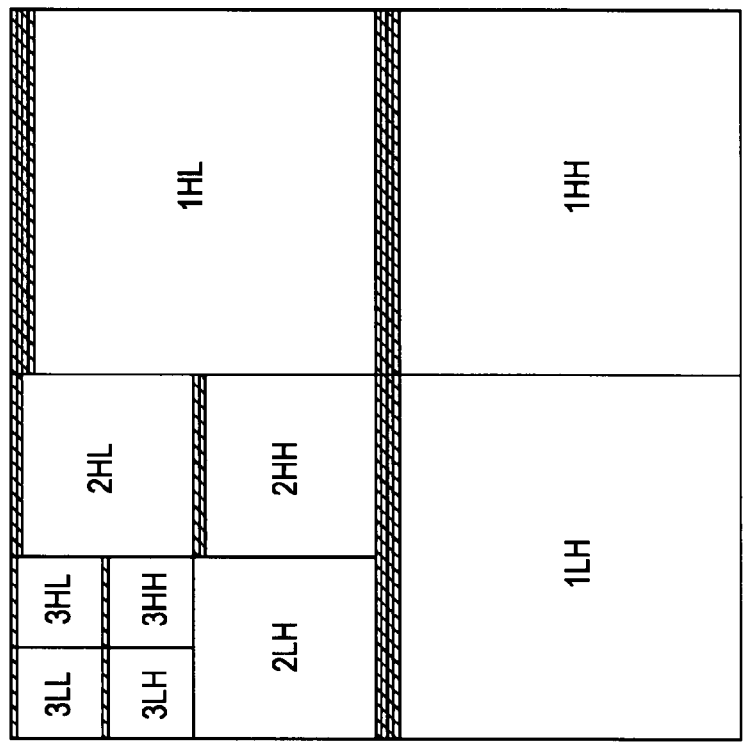
FIGS. 4A and 4B illustrate a line-based wavelet transform.
Figure 4A:
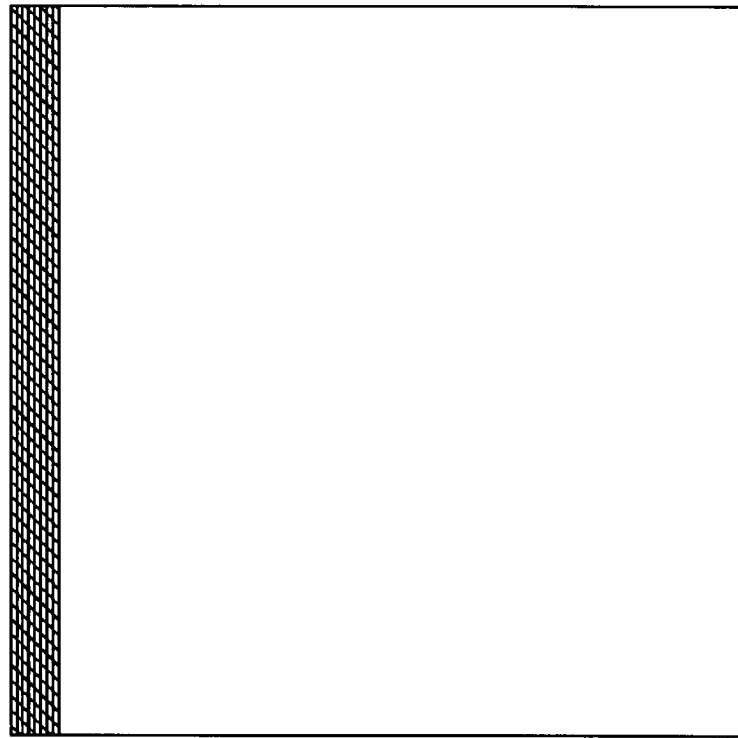

The line-based analysis filter unit 141 performs such a wavelet transform in each line block obtained by dividing a single picture by a predetermined number of lines. FIGS. 4A and 4B illustrate such a line-based wavelet transform.

The line block is formed by some consecutive lines within the picture as shown as slash lines in FIG. 4A. In this case, as shown in FIG. 4B, in the wavelet transform process, the number of lines is reduced whenever the analysis filter is iterated.

In the case of FIGS. 4A and 4B, for the baseband image data shown in FIG. 4A, if a line block 8 lines is divided up to a division level 3 as shown in FIG. 4B, the number of lines becomes 4 in the subbands (1HH, 1HL, and 1LH) of a division level 1, the number of lines becomes 2 for the subbands (2HH, 2HL, and 2LH) of a division level 2, and the number of lines becomes 1 for the subbands (3HH, 3HL, 3LH, and 3LL) of a division level 3.

Therefore, the line block has at least the number of lines necessary for making the number of lines in the lowest frequency subband after the wavelet transform become equal to or larger than 1.

The line-based analysis filter unit 141 has a horizontal analysis filter unit 161 which executes analysis filtering in the horizontal direction and a vertical analysis filter unit 162 which executes an analysis filtering in the vertical direction.

First, the line-based analysis filter unit 141 performs analysis filtering in the horizontal direction using the horizontal analysis filter unit 161 and performs analysis filtering in the vertical direction for the processing result using the vertical analysis filter unit 162. The analysis filtering is iterated in both horizontal and vertical directions in the same order for the LL component of that processing result up to a predetermined division level.

Next, a computation method in the aforementioned analysis filtering will be described in detail. The most general method used as the computation method in analysis filtering is a so-called convolution computation. The convolution computation is the most fundamental means for implementing a digital filter. The convolution computation is performed by convolution multiplication of actual input data by the tap coefficient of the filter. However, in this convolution computation, as the tap length increases, the calculation load increases accordingly.

An example of a lifting technology in wavelet transform of the above-described related art is disclosed in a technical article "The lifting scheme: A custom-design construction of biorthogonal wavelets", by W. Swelden, Applied and Computational Harmonic Analysis, vol 3, No. 2, pp. 186-200, 1996.

FIG. 5 illustrates a lifting scheme in a 9×7 analysis filter employed in the JPEG2000 standard. Analysis filtering when the lifting technology is applied to this 9×7 analysis filter will be described.

Referring to FIG. 5, the first row (the uppermost row) represents a sample group (a row of pixels) of an input image, and second and third rows represent the components (coefficients) generated by steps A1 and A2, respectively. The fourth row represents a high-frequency component output generated by the step A3, and the fifth row represents a low-frequency component output generated by the step A4. The uppermost row is not limited to the sample group of the input image, but may be coefficients that can be obtained by the previous analysis filtering. Here, the uppermost row is a sample group of the input image. In addition, the solid rectangle "■" denotes an even-numbered sample or line, and the solid circle "●" denotes an odd-numbered sample or line.

In the analysis filtering applying lifting technology to the 9×7 analysis filter, the high-frequency component is obtained through the step A3, and the low-frequency component is obtained through the step A4. The process of the steps A1 to A4 can be expressed as the following equations (1) to (4);

Step A1: $d_i^1 = d_i^0 + \alpha(s_i^0 + s_{i+1}^0)$ (1)

Step A2: $s_i^1 = s_i^0 + \beta(d_{i-1}^1 + d_i^1)$ (2)

Step A3: $d_i^2 = d_i^1 + \gamma(s_i^1 + s_{i+1}^1)$ (3)

Step A4: $s_i^2 = s_i^1 + \delta(d_{i-1}^1 + d_i^2)$ (4)

where, $\alpha = -1.586134342$, $\beta = -0.0529801185$, $\gamma = 0.8829110755$, and $\delta = 0.4435068520$.

In the analysis filtering employing lifting technology in this way, the coefficient of the low-frequency component is generated in the step A4 after the steps A1 and A2 are executed, and then, the coefficient of the high-frequency component is generated in the step A3. A filter bank used in this case may be implemented by using only the addition and shift computations as represented in the equations (1) to (4). Therefore, it is possible to remarkably reduce the calculation amount. In this regard, as will be described later, this lifting technology is applied to the horizontal and vertical analysis filtering processes.

Figure 6:
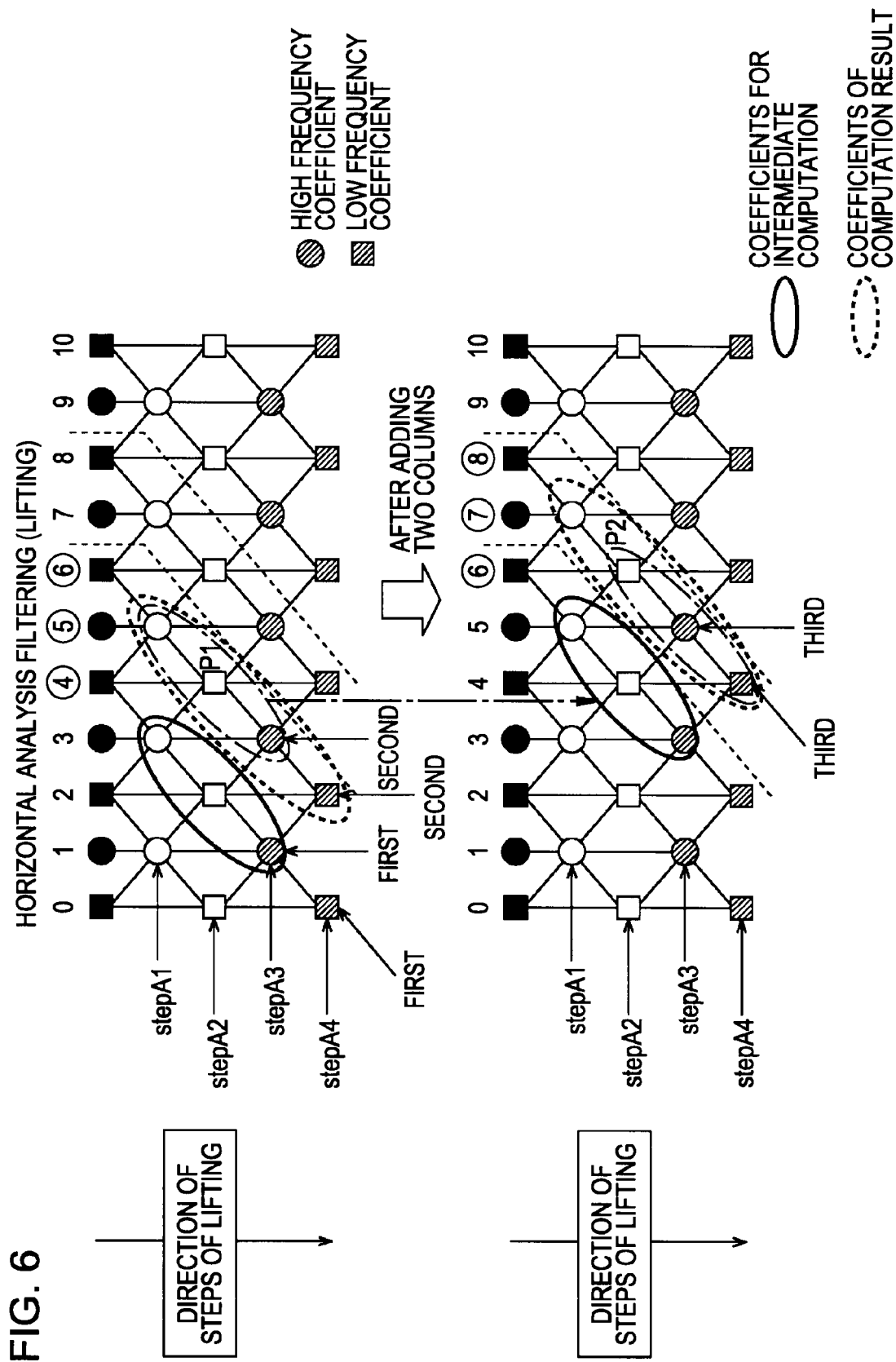
FIG. 6 illustrates an example of a lifting operation.

First, a horizontal analysis filtering process will be described in detail. FIG. 6 illustrates an exemplary case where the horizontal analysis filtering is executed by the lifting scheme of FIG. 5.

FIG. 6 illustrates an example where the coefficient of the high-frequency component (hereinafter, also referred to as a high-frequency coefficient) and the coefficient of the low-frequency component (hereinafter, also referred to as a low-frequency coefficient) are generated through the four steps A1 to A4 described above in conjunction with FIG. 5 for the input coefficients of the horizontal direction. The direction of steps of the lifting advances from the top to the bottom in the drawing. The numbers represented in the upper portions of the coefficients in the horizontal direction denote column numbers.

The circles and rectangles provided in the first row from the top denote input high-frequency and low-frequency coefficients, respectively. The circles and rectangles provided in the second and subsequent rows denote high-frequency coefficients and low-frequency coefficients, respectively, generated in the course of the lifting computation process. Among them, the hatched circles and rectangles denote high-frequency and low-frequency coefficients, respectively, resulted from the lifting computation.

Hereinafter, operations will be sequentially described from the top. The upper half of FIG. 6 illustrates a case where coefficients of three columns (column numbers 4 to 6) are input in the horizontal direction, and a computation is performed using a lifting scheme of a horizontal direction (hereinafter, referred to as a horizontal lifting computation).

In order to obtain a first high-frequency coefficient in the step A3 of this horizontal lifting computation and obtain a first low-frequency coefficient in the step A4, coefficients of five columns (column numbers 0 to 4) are to be input.

Then, in order to obtain second high-frequency and low-frequency coefficients, three coefficients bounded by the thick solid line and the coefficients of two columns (encircled column numbers 5 and 6) are demanded. Further, in order to calculate the coefficient P1 in the step A2, the coefficient of the encircled column number 4 is also demanded.

The three coefficients bounded by the thick solid line are a part of the coefficients generated in the course of the horizontal lifting computation for obtaining the first high-frequency and low-frequency coefficients (hereinafter, also referred to as a first horizontal lifting computation).

Accordingly, in order to obtain the second high-frequency and low-frequency coefficients, the coefficients of three columns (encircled column numbers 4 to 6) are to be input, and the three coefficients bounded by the thick solid line, generated in the course of the first horizontal lifting computation, are to be latched as coefficients for an intermediate computation. Practically, since the number of the latched coefficients is at most three, a small capacity storage area such as a flip-flop may be used for this purpose.

Therefore, four coefficients (bounded by the thick dotted line) including the second high-frequency and low-frequency coefficients are generated by completing or in the course of the horizontal lifting computation using the three coefficients bounded by the thick solid line, latched in the first horizontal lifting computation, and the input coefficients of the three columns (column numbers 4 to 6). Among them, since the three coefficients bounded by the one-dotted chain line are demanded for obtaining third high-frequency and low-frequency coefficients, they are latched in an internal flip-flop as coefficients for an intermediate computation.

The lower half of FIG. 6 illustrates a case where coefficients of two columns following the coefficient of the column (column number 6) are additionally input in the horizontal direction, i.e., where coefficients of three columns (column numbers 6 to 8) are input in the horizontal direction to perform the horizontal lifting computation.

Similar to the second case, in order to obtain the third high-frequency and low-frequency coefficients, three coefficients bounded by the thick solid line and coefficients of two columns (encircled column numbers 7 and 8) are demanded. In addition, in order to calculate the coefficient of P2 in step A2, the coefficient of the encircled column number 6 is also demanded.

The three coefficients bounded by the thick solid line in the lower half are latched in a flip-flop by the second horizontal lifting computation as shown in the one-dotted chain line in the upper half.

Therefore, four coefficients (bounded by the thick dotted line) including the third high-frequency and low-frequency coefficients are generated by performing the horizontal lifting computation using the three coefficients bounded by the thick solid line, latched by the second horizontal lifting computation, and the input coefficients of three columns (column numbers 6 to 8). Among them, the three coefficients bounded by the one-dotted chain line are demanded for obtaining fourth high-frequency and low-frequency coefficients. Therefore, they are latched in an internal flip-flop.

Through the aforementioned operation, the horizontal analysis filtering is completed by executing the horizontal lifting computation up to the rightmost column in a screen while coefficients corresponding to three columns are sequentially input, and three coefficients for an intermediate computation are stored.

While, in the aforementioned description, an example of horizontal analysis filtering of a single line using a lifting scheme has been described, horizontal analysis filtering is performed using the lifting scheme by sequentially inputting lines of coefficients from the top to the bottom based on the aforementioned operation.

As a predetermined number of coefficients are collected in the vertical direction, i.e., as a predetermined number of lines are collected, a computation using the lifting scheme in a vertical direction (i.e., a vertical lifting computation) is performed from the left to the right as shown in the direction of steps of the lifting of the right side.

Figure 7:
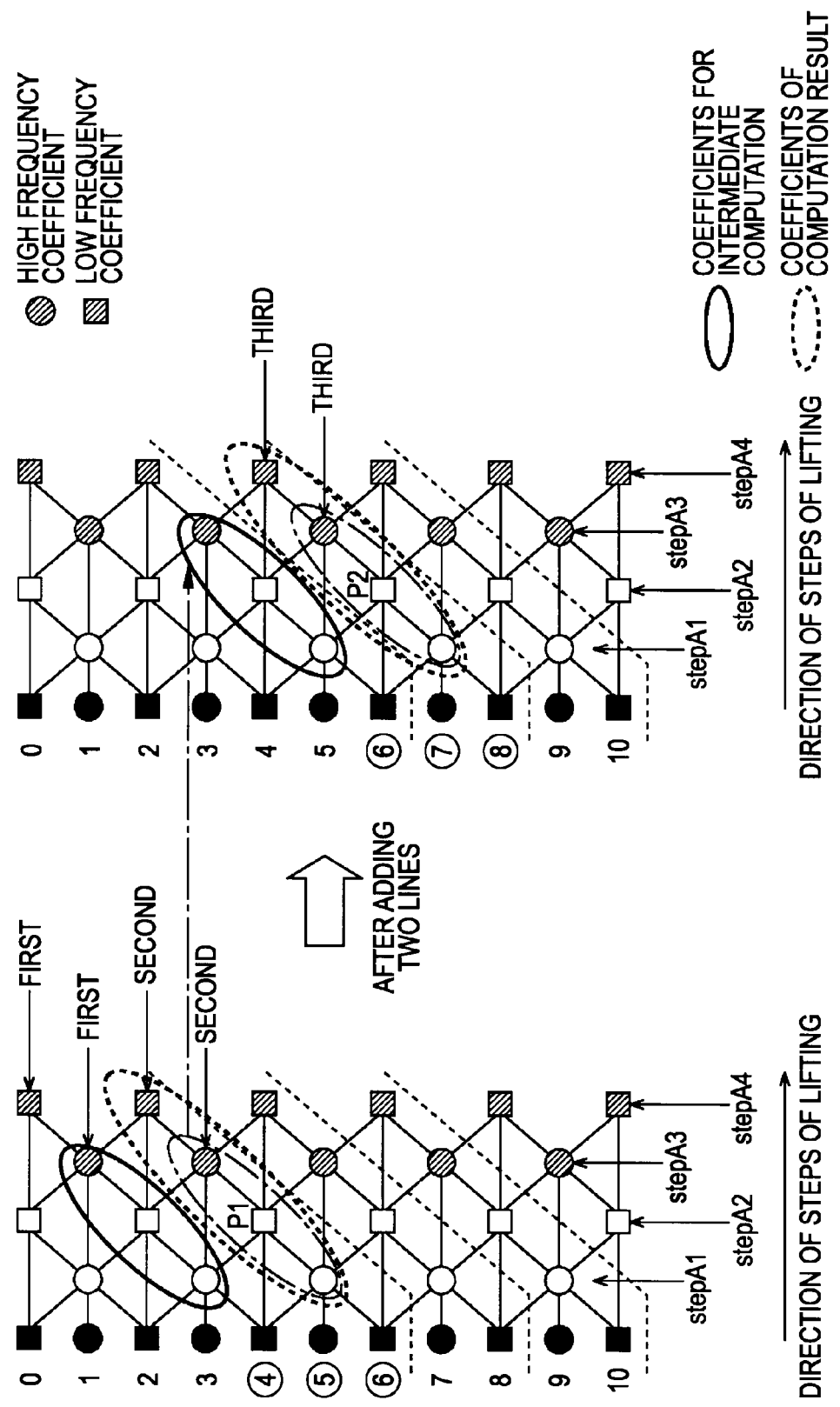
FIG. 7 illustrates an example of a lifting operation.

Next, the vertical analysis filtering will be described in detail. FIG. 7 illustrates a case where the vertical analysis filtering is executed using the lifting scheme of FIG. 5.

FIG. 7 focuses on a single coefficient deployed and lined up in the horizontal direction. It would be apparent that, in an actual 2-dimensional wavelet transform, only the number of coefficients of the vertical direction in the frequency components generated in the course of the wavelet transform (i.e., the subbands) is demanded in the calculation of the vertical analysis filtering.

FIG. 7 illustrates an example where the high-frequency and low-frequency coefficients are generated through the four steps A1 to A4 described above in conjunction with FIG. 5 for the coefficients of the vertical direction. The direction of the steps of the lifting advances from the left to the right in the drawing. Further, the numbers represented in the left of the coefficients of the vertical direction denote line numbers.

The circles and rectangles provided in the first column from the left denote high-frequency coefficients and low-frequency coefficients, respectively, that are input. The circles and rectangles provided in the second and subsequent columns denote high-frequency coefficients and low-frequency coefficients, respectively, generated in the course of the lifting computation. Among them, the hatched circles and rectangles denote high-frequency coefficients and low-frequency coefficients, respectively, corresponding to results of the lifting computation.

Hereinafter, operations will be sequentially described from the left. The left half of FIG. 7 illustrates a case where coefficients of three line numbers 4 to 6 are input in the vertical direction to perform the vertical lifting computation.

In this vertical lifting computation, in order to obtain the first high-frequency coefficient in the step A3 and obtain the first low-frequency coefficient in the step A4, coefficients of five line numbers 0 to 4 are demanded.

Then, in order to obtain the second high-frequency and low-frequency coefficients, three coefficients bounded by the thick solid line and coefficients of two lines (encircled line numbers 5 and 6) are demanded. Further, in order to calculate the coefficient of P1 in step A2, the coefficient of the encircled line number 4 is also demanded.

The three coefficients bounded by the thick solid line are a part of the coefficients generated in the course of the vertical lifting computation for obtaining the first high-frequency and low-frequency coefficients (hereinafter, referred to as a first vertical lifting computation).

Accordingly, in order to obtain second high-frequency and low-frequency coefficients, coefficients of three lines (encircled line numbers 4 to 6) are to be input. In addition, the three coefficients bounded by the thick solid line, generated in the course of the first vertical lifting computation, are demanded. The three coefficients are stored as coefficients for an intermediate computation.

Therefore, it is possible to obtain four coefficients (bounded by the thick dotted line) including the second high-frequency and low-frequency coefficients by performing the vertical lifting computation using the three coefficients bounded by the thick solid line, stored by the first vertical lifting computation, and the coefficients of three lines (line numbers 4 to 6) read and input from a buffer of a corresponding level. In this manner, since the three coefficients bounded by the one-dotted chain line are demanded for obtaining the third high-frequency and low-frequency coefficients, they are stored.

The right half of FIG. 7 illustrates a case where coefficients of two lines following the coefficient of the line number 6 are additionally read, i.e., where coefficients of three lines (line numbers 6 to 8) are input in the vertical direction, and the vertical lifting computation is performed.

Similar to the second case, in order to obtain the third high-frequency and low-frequency coefficients, three coefficients bounded by the thick solid line and coefficients of two lines (encircled line numbers 7 and 8) are demanded. Further, in order to calculate coefficients of P2 in step A2, the coefficient of the encircled line number 6 is also demanded.

The three coefficients bounded by the thick solid line in the right half has been stored by the second vertical lifting computation as shown as the one-dotted chain line in the left half. Therefore, it is possible to obtain four coefficients (bounded by the thick dotted line) including the third high-frequency and low-frequency coefficients by performing the vertical lifting computation using the three coefficients bounded by the thick solid line, stored by the second vertical lifting computation, and the coefficients of three lines (line numbers 6 to 8) read and input from a buffer of a corresponding level. Among them, since the three coefficients bounded by the one-dotted chain line are demanded for obtaining fourth high-frequency and low-frequency coefficients, they are stored.

Through the aforementioned operation, the vertical analysis filtering is completed by performing the vertical lifting computation up to the lowest line in a screen while coefficients of three lines are sequentially input, and three coefficients are stored for an intermediate computation.

Returning to FIG. 2, the wavelet coefficients generated as described above are temporarily stored in the buffer 142.

The reversible encoding unit 143 is controlled by the reversible encoding control unit 152 to read the coefficient data as soon as a predetermined amount of coefficient data are accumulated in the buffer 142 and perform entropy encoding using the reversible encoding scheme to generate a code stream.

The reversible encoding unit 143 has an EBCOT (Embedded Coding with Optimized Truncation) unit 171, a header generating unit 172, and a packet generating unit 173. The EBCOT unit 171 performs entropy encoding, so-called EBCOT, specified in the JPEG2000 standard for the input coefficient data. The EBCOT is a technique of encoding in each block having a predetermined size while measuring the statistic amount of the coefficients in that block. The EBCOT unit 171 has a bit modeling unit 181 and an arithmetic encoding unit 182.

The bit modeling unit 181 performs bit modeling for the coefficient data in the order defined in the standard of the encoding scheme and transmits the context to the arithmetic encoding unit 182. The arithmetic encoding unit 182 performs arithmetic encoding for the bit-plane of the coefficients.

The horizontal and vertical sizes of the code block are selected from powers of two ranged from 4 to 256 such as 32×32, 64×64, and 128×32. The coefficient values are represented as n-bit signed binary numbers so that the bit 0 to the bit (n−2) represent the least significant bit (LSB) to the most significant bit (MSB). The remaining one bit represents a sign. The encoding of the code block is performed sequentially from the MSB side bit-plane, for example, through three kinds of encoding passes including a significant propagation pass, a magnitude refinement pass, and a cleanup pass.

The arithmetic encoding unit 207 supplies the header generating unit 172 and the packet generating unit 173 with the generated code stream.

The packet generating unit 173 packetizes the supplied encoded code streams. The header generating unit 172 generates header information of that packet and supplies the header information to the packet generating unit 173. The packet generating unit 173 performs packetization using that header information. The generated packet is output to the outside of the reversible line-based encoding unit 101.

Configuration of Reversible Decoding Unit

Figure 8:
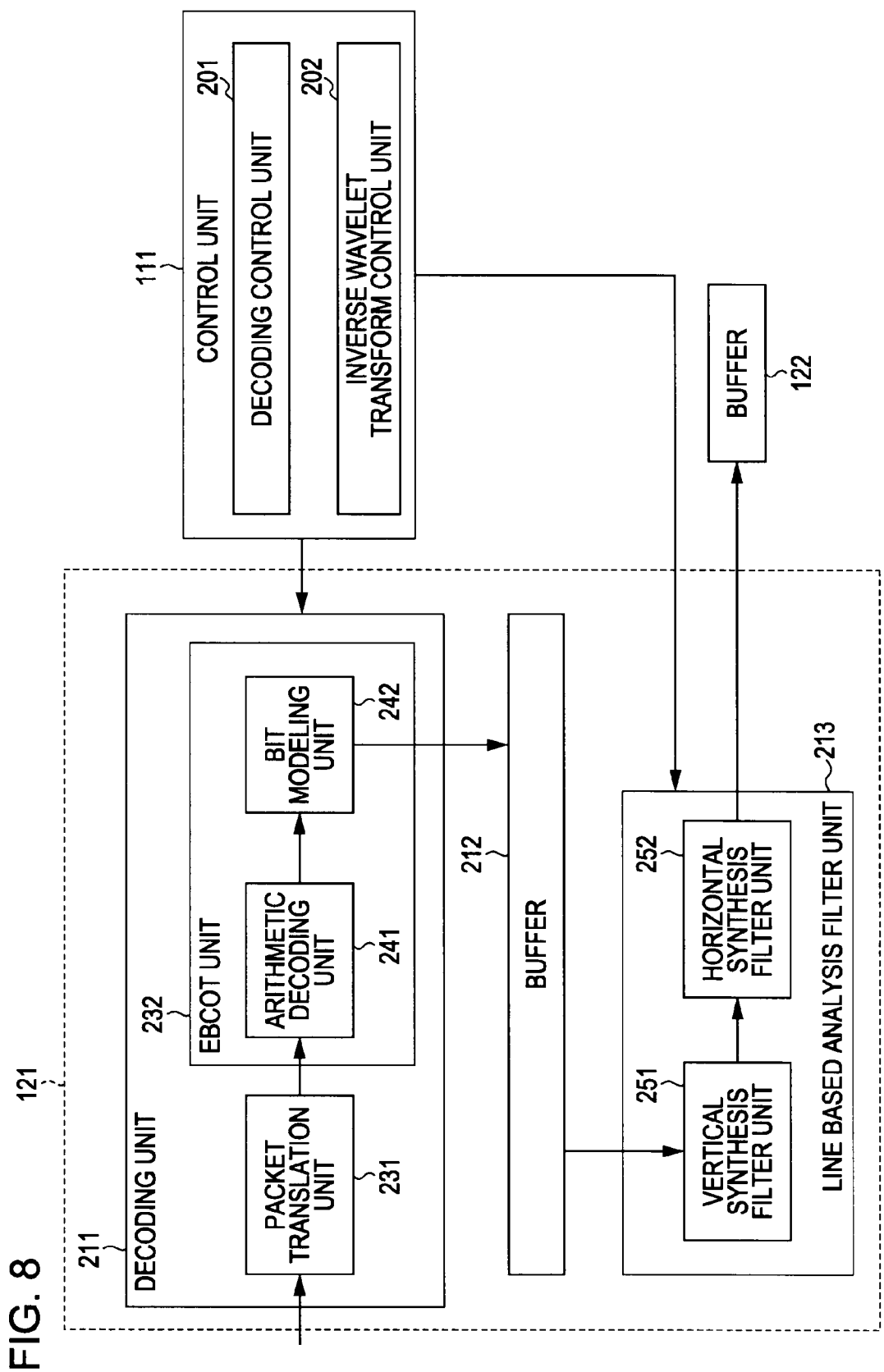
FIG. 8 is a block diagram illustrating an exemplary configuration of a reversible line-based decoding unit.

Next, the reversible line-based decoding unit 121 of FIG. 1 will be described. FIG. 8 is a block diagram illustrating an exemplary configuration of the control unit 111 and the reversible line-based decoding unit 121.

Referring to FIG. 8, the reversible line-based decoding unit 121 has a decoding unit 211, a buffer 212, and a line-based synthesis filter unit 213.

The control unit 111 has a decoding control unit 201 which controls the operation of the decoding unit 211 and an inverse wavelet transform control unit 202 which controls the operation of the line-based synthesis filter unit 213.

The decoding unit 211 is controlled by the decoding control unit 201 to decode the code stream input from the outside of the irreversible transcoding unit 102 using a decoding method corresponding to the encoding method in the reversible line-based encoding unit 101.

The decoding unit 211 has a packet translation unit 231 and an EBCOT unit 232. The packet translation unit 231 is controlled by the decoding control unit 201 to translate the packet and supply the code stream to the EBCOT unit 232. The EBCOT unit 232 performs entropy decoding so-called EBCOT specified in the standard for the input code stream.

The EBCOT unit 232 has an arithmetic decoding unit 241 and a bit modeling unit 242. The arithmetic decoding unit 241 decodes the code stream using a method corresponding to the arithmetic encoding unit 182 to supply the context to the bit modeling unit 242. The bit modeling unit 242 generates wavelet coefficients using a method corresponding to the bit modeling unit 181. The bit modeling unit 242 supplies the generated coefficient data to the buffer 212, where they are stored.

The line-based synthesis filter unit 213 is controlled by the inverse wavelet transform control unit 202 to read the coefficient data as soon as a predetermined amount of coefficient data are accumulated in the buffer 212 and perform an inverse line-based wavelet transform in which a synthesis filtering process for synthesizing coefficients of the low-frequency and high-frequency components in each line block including a predetermined number of lines is recursively iterated from the low-frequency component.

Figure 9A:
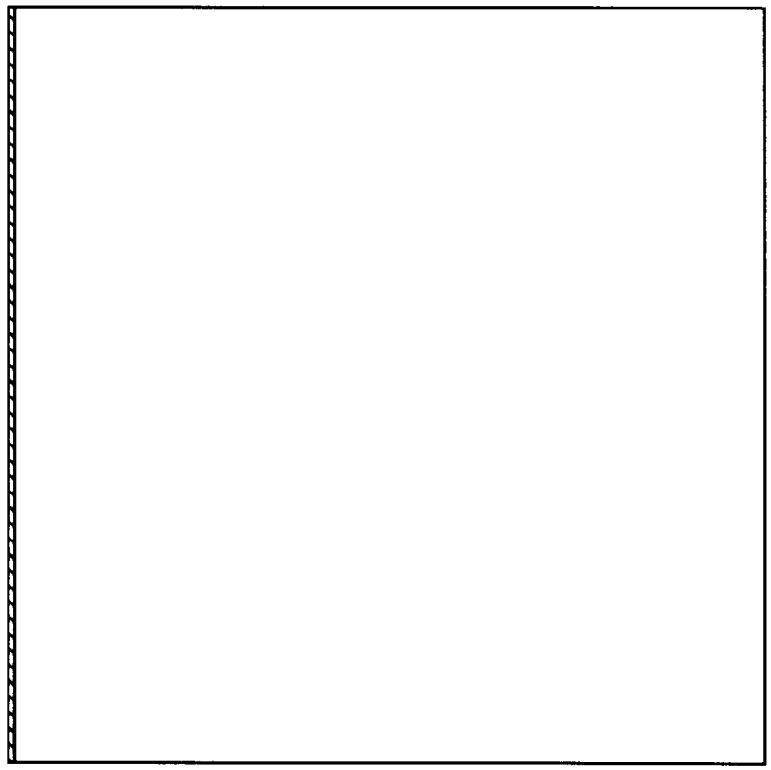
FIGS. 9A and 9B illustrate an inverse line-based wavelet transform.
Figure 9B:
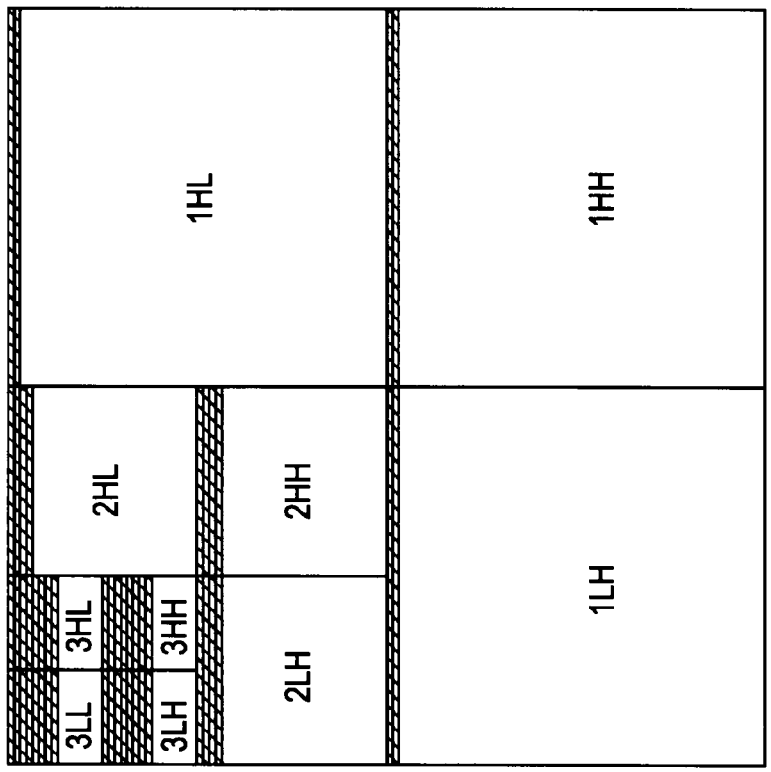

The line-based synthesis filter unit 213 performs such an inverse wavelet transform in each line block obtained by dividing each subband by a predetermined number of lines. FIGS. 9A and 9B illustrate such an inverse line-based wavelet transform.

As shown as slash lines in FIG. 9A, the line block is formed by a part of the lines consecutive in each subband. It is noted that, as shown in FIG. 9A, the number of lines is reduced as the synthesis filtering is iterated in the inverse wavelet transform process.

In the case of FIGS. 9A and 9B, the synthesis filtering progresses for the line block including 8 lines in the lowest frequency subband shown in FIG. 9A. When the synthesis is performed up to the baseband as shown in FIG. 9B, the number of lines in that baseband becomes 1.

Therefore, in the lowest frequency subband, the line block has at least a number of lines demanded for making the number of lines in the baseband after the inverse wavelet transform become equal to or larger than 1.

The line-based synthesis filtering unit 213 has a vertical synthesis filter unit 251 which performs synthesis filtering in the vertical direction and a horizontal synthesis filter unit 252 which executes synthesis filtering in the horizontal direction.

First, the line-based synthesis filter unit 213 performs synthesis filtering in the vertical direction for four components (LL, LH, HL, and HH) of the lowest frequency division level using the vertical synthesis filter unit 251 and performs synthesis filtering in the horizontal direction for that processing result using the horizontal synthesis filter unit 252. The synthesis filtering is iterated in both the horizontal and vertical directions in the same order for four components having the lowest frequency division level of the processing result until a predetermined division level is reached.

Since it is possible to effectively perform filtering corresponding to analysis filtering used when the aforementioned lifting technology is applied, it is preferable to similarly use the lifting technology even in the synthesis filtering of the inverse wavelet transform.

Figure 10:
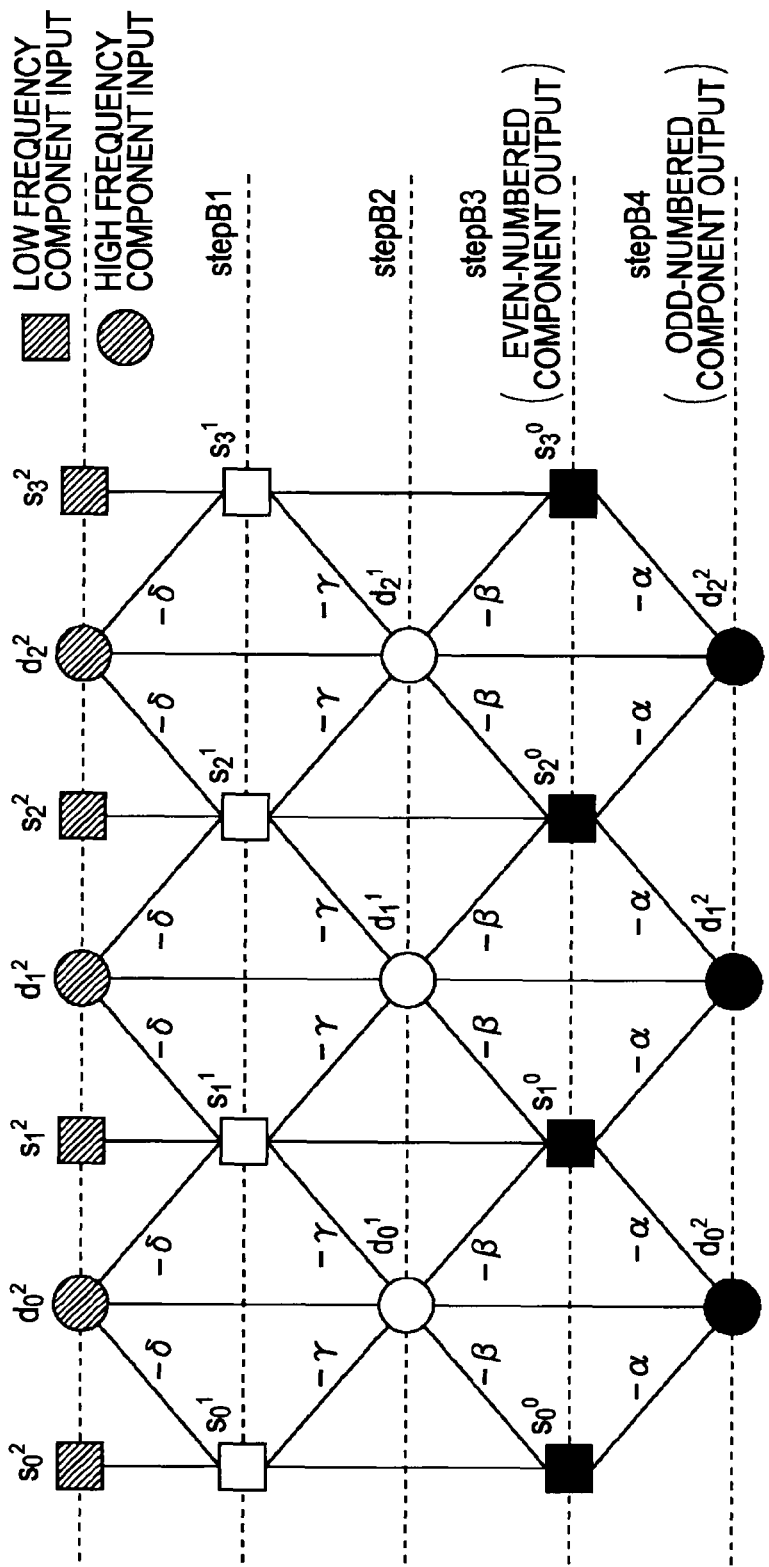
FIG. 10 illustrates an example of a 9×7 synthesis filter.

FIG. 10 illustrates a lifting scheme for a 9×7 synthesis filter employed also in the JPEG2000 standard. Synthesis filtering when the lifting technology is applied to this 9×7 synthesis filter will be described.

In the example shown in FIG. 10, the first row (the uppermost row) represents coefficients generated by the wavelet transform, in which the solid circle "●" denotes a coefficient of a high-frequency component, and the solid rectangle "■" denotes a coefficient of a low-frequency component. The second and third rows represent components (coefficients) generated by the processing of steps B1 and B2, respectively. The fourth row represents an even-numbered component output generated by the processing of step B3, and the fifth row represents an odd-numbered component output generated by the processing of step B4.

In the synthesis filtering in which the lifting technology is applied to the 9×7 synthesis filter, the even-numbered components can be obtained through the processing of step B3, and the odd-numbered components can be obtained through the processing of step B4. The processing of steps B1 to B4 can be expressed as the following equations (5) to (8).

$$\text{Step B1: } s_i^1 = s_i^2 - \delta(d_{i-1}^2 + d_i^2) \quad (5)$$

$$\text{Step B2: } d_i^1 = d_i^3 - \gamma(s_i^1 + s_{i+1}^1) \quad (6)$$

$$\text{Step B3: } s_i^0 = s_i^1 - \beta(d_{i-1}^1 + d_i^1) \quad (7)$$

$$\text{Step B4: } d_i^0 = d_i^1 - \alpha(s_i^0 + s_{i+1}^0) \quad (8)$$

where, $\alpha=-1.586134342$, $\beta=-0.0529801185$, $\gamma=0.8829110755$, and $\delta=0.4435068520$.

In this manner, in the synthesis filtering employing the lifting technology, the coefficients of the even-numbered components are generated in step B3 following steps B1 and B2, and then, the coefficients of the odd-numbered components are generated in step B4. Filter banks used in this case can be implemented only by division and shift computations as shown in the equations (5) to (8). Therefore, it is possible to remarkably reduce a calculation amount.

In this regard, as will be described later, this lifting technology is applied to the horizontal and vertical synthesis filtering processes. Basically, although the equations may be different, the vertical synthesis filtering performs the operations similar to those of the vertical analysis filtering described above in conjunction with FIG. 7, and horizontal synthesis filtering performs the operations similar to those of the horizontal analysis filtering described above in conjunction with FIG. 6.

Figure 11:
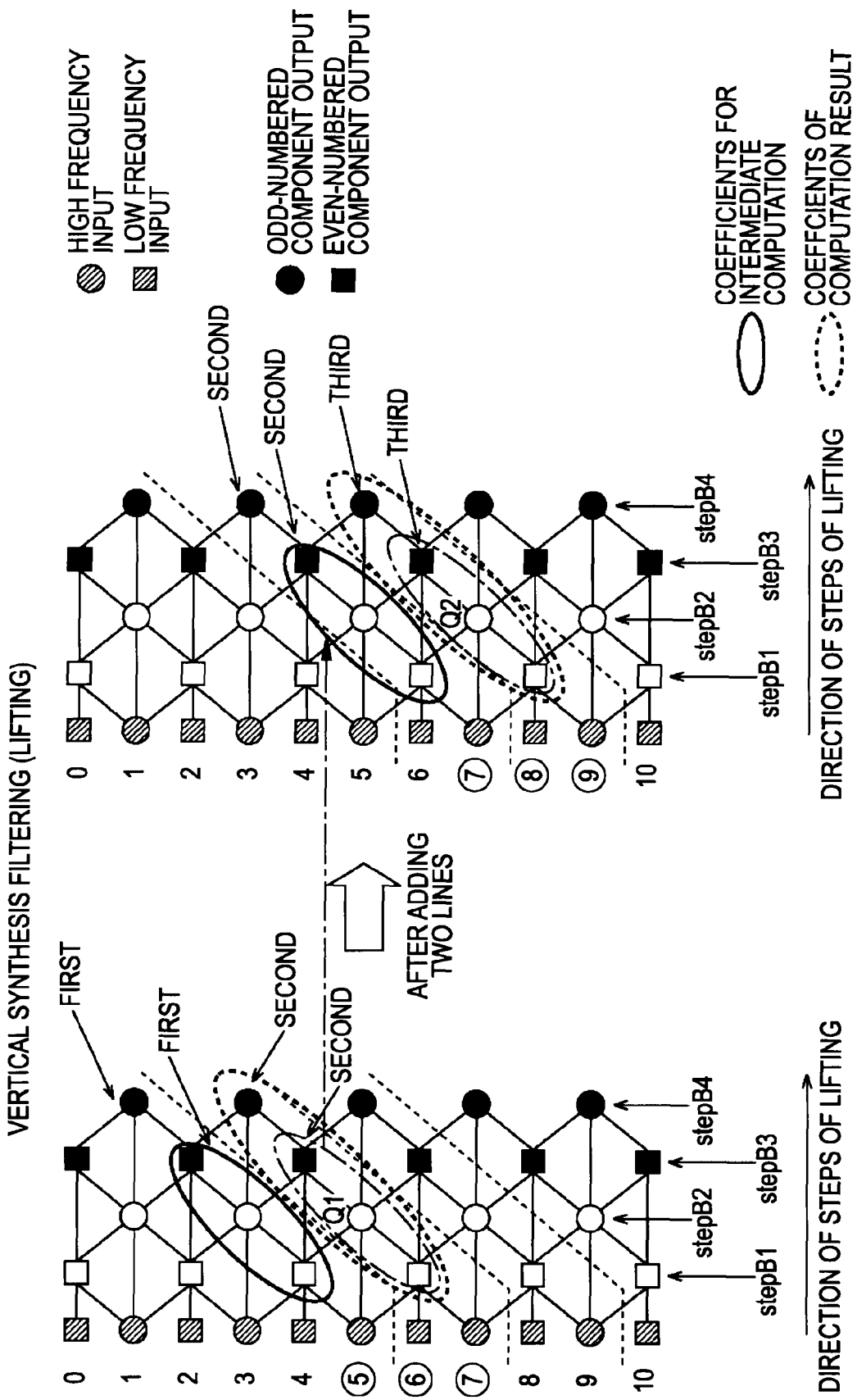
FIG. 11 illustrates an example of a lifting operation.

First, the vertical synthesis filtering process will be described in detail. FIG. 11 illustrates an example of the vertical synthesis filtering for a coefficient group of a vertical direction based on the lifting scheme of FIG. 10.

FIG. 11 illustrates an example where even-numbered coefficients (hereinafter, also referred to as even coefficients) and odd-numbered coefficients (hereinafter, also referred to as odd coefficients) are generated for the coefficients of the vertical direction through the processing of four steps B1 to B4 described above in conjunction with FIG. 10. The direction of steps of the lifting advances from the left to the right in the drawing.

The numbers provided in the left side of the coefficients of the vertical direction denote line numbers. The hatched circles and rectangles provided in the first column from the left denote high-frequency inputs and low-frequency inputs, respectively. The second and subsequent circles and rectangles denote high-frequency and low-frequency coefficients, respectively, generated in the course of the lifting computation. Among them, the solid circles and rectangles denote the odd-numbered and even-numbered coefficients, respectively, resulted from the lifting computation.

Hereinafter, operations will be sequentially described from the left. The left half of FIG. 11 illustrates a case where the coefficients of three lines (line numbers 4 to 6) in the vertical direction are input, and a computation using a lifting scheme in a vertical direction (i.e., a vertical lifting computation) is performed. In this case, since the uppermost even coefficient is not associated with the odd coefficient, a description thereof will be omitted.

In this vertical lifting computation, in order to obtain the first even coefficient in step B3 and obtain the first odd coefficient in step B4, coefficients of six lines (line numbers 0 to 5) are demanded.

Then, in order to obtain the second even and odd coefficients, three coefficients bounded by the thick solid line and coefficient of two lines (encircled line numbers 6 and 7) are demanded. Further, in order to calculate the coefficient of Q1 in step B2, the coefficient of the encircled line number 5 is demanded.

The three coefficients bounded by the thick solid line are a part of the coefficients generated in the course of the vertical lifting computation for obtaining the first even and odd coefficients (hereinafter, referred to as a first vertical lifting computation).

Accordingly, in order to obtain second even and odd coefficients, coefficients of three lines (encircled line numbers 5 to 7) are to be input. Further, in order to obtain the first even and odd coefficients, the three coefficients bounded by the thick solid line, generated in the course of the vertical lifting computation, are to be stored. In this case, the coefficients of the three lines of a vertical direction are read in each level.

Therefore, it is possible to obtain four coefficients (bounded by the thick dotted line) including the second even and odd coefficients by performing the vertical lifting computation using the three coefficients bounded by the thick solid line, stored in a buffer through the first vertical lifting computation, and the input coefficients of three lines (line numbers 5 to 7). Among them, since the three coefficients bounded by the one-dotted chain line are demanded for obtaining third even and odd coefficients, they are stored.

The right half of FIG. 11 illustrates a case where coefficients of two lines following the coefficient of the line number 7 are additionally read, i.e., where the coefficients of three lines (line numbers 7 to 9) are input in the vertical direction to perform the vertical lifting computation.

Similar to the second case, in order to obtain the third even and odd coefficients, the three coefficients bounded by the thick solid line and the coefficients of two lines (encircled line numbers 8 and 9) are demanded. Further, in order to calculate the coefficient of Q2 in step B2, the coefficient of the encircled line number 7 is also demanded.

The three coefficients bounded by the thick solid line in the right half are stored in a coefficient buffer through the second vertical lifting computation shown as the one-dotted chain line in the left half.

Therefore, it is possible to obtain four coefficients (bounded by the thick dotted line) including the third even and odd coefficients by performing the vertical lifting computation using the three coefficients bounded by the thick solid line, stored through the second vertical lifting computation, and the input coefficients of three lines (line numbers 7 and 9). Among them, since the three coefficients bounded by the one-dotted chain line are demanded for obtaining the third even and odd coefficients, they are stored.

Through the aforementioned operation, vertical synthesis filtering is completed by performing the vertical lifting computation up to the lowest line in a screen while coefficients of three lines are sequentially input, and three coefficients are stored for an intermediate computation.

Figure 12:
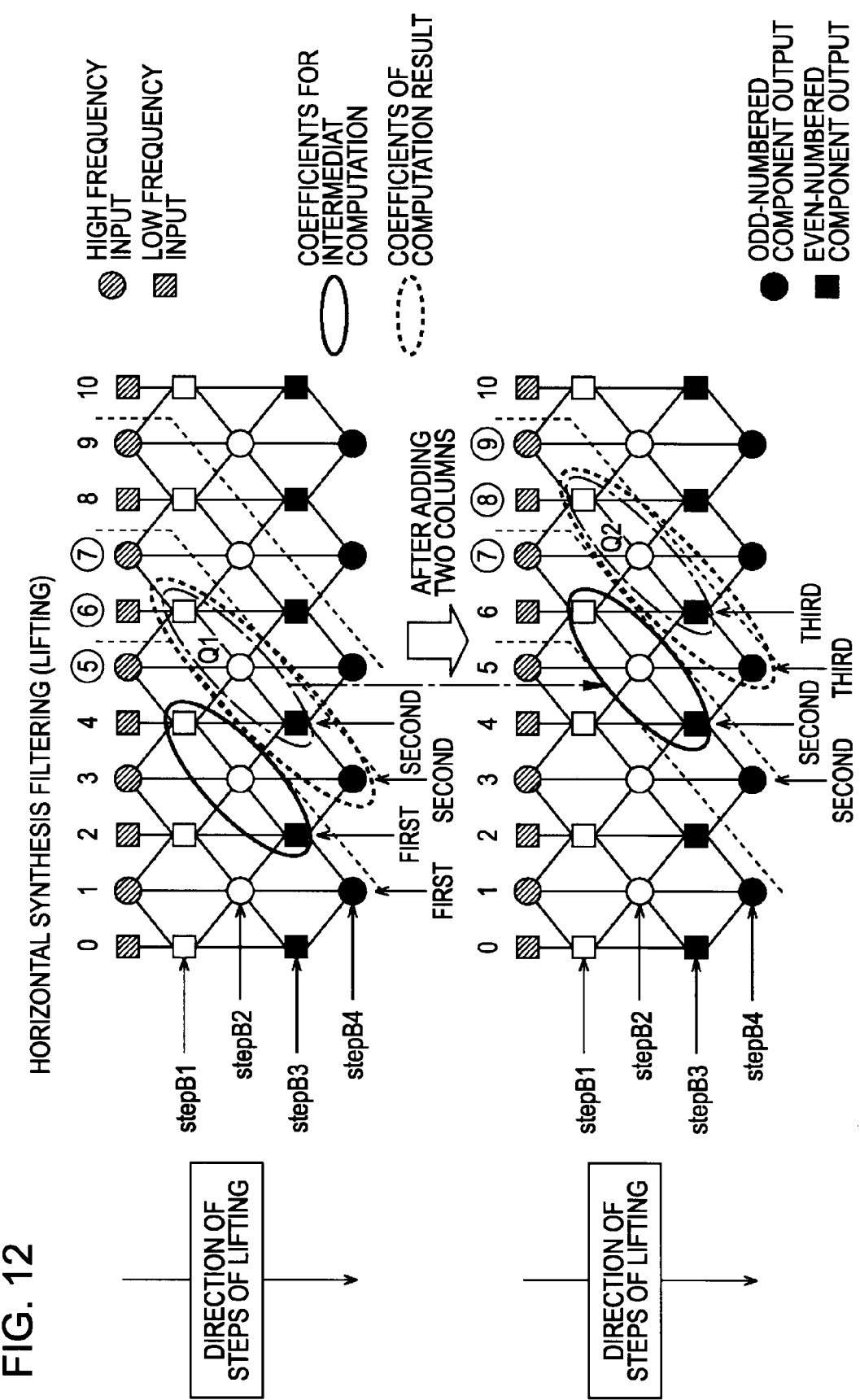
FIG. 12 illustrates an example of a lifting operation.

Next, horizontal synthesis filtering will be described in detail. FIG. 12 illustrates a case where the results of vertical synthesis filtering are arranged in the horizontal direction, and horizontal synthesis filtering is performed using the lifting scheme of FIG. 10.

FIG. 12 illustrates an example where the odd and even coefficients are generated through the four steps B1 to B4 described above in conjunction with FIG. 10 for coefficients of the horizontal direction, and the direction of steps of the lifting advances from the top to the bottom.

The numbers provided over the coefficients of the horizontal direction denote column numbers. The hatched circles and rectangles of the first row from the top denote high-frequency and low-frequency inputs, respectively. The second and subsequent circles and rectangles denote high-frequency and low-frequency coefficients, respectively, generated in the course of the lifting computation. Among them, the solid circles and rectangles denote odd and even coefficients, respectively, resulted from the lifting computation.

Hereinafter, operations will be sequentially described from the top. The upper half of FIG. 12 illustrates a case where coefficients of three columns (column numbers 5 to 7) are input in the horizontal direction to perform a computation using a lifting scheme in the horizontal direction (hereinafter, referred to as a horizontal lifting computation). In this case, since the even coefficient in the leftmost side is not associated with the odd coefficient, a description thereof will be omitted.

In this horizontal lifting computation, in order to obtain a first even coefficient in step B3 and obtain a first even coefficient in step B4, coefficients of six columns (column numbers 0 to 5) are demanded.

Then, in order to obtain second odd and even coefficients, three coefficients bounded by the thick solid line and coefficients of two columns (encircled column numbers 6 and 7) are demanded. Further, in order to calculate the coefficient of Q1 in step B2, the coefficient of the encircled column number 5 is also demanded.

The three coefficients bounded by the thick solid line are a part of the coefficients generated in the course of the horizontal lifting computation for obtaining the first odd and even coefficients (hereinafter, also referred to as a first horizontal lifting computation).

Accordingly, in order to obtain second odd and even coefficients, coefficients of three columns (encircled column numbers 5 to 7) are to be input, and further, three coefficients bounded by the thick solid line, generated in the course of the first horizontal lifting computation, are to be latched. Practically, since the number of the latched coefficients is three at most, a small capacity storage area such as a flip-flop may be used for this purpose.

Therefore, it is possible to obtain four coefficients (bounded by the thick dotted line) including the second odd and even coefficients after completing or in the course of the horizontal lifting computation using the three coefficients bounded by the thick solid line, latched through the first horizontal lifting computation, and the input coefficients of three columns (column numbers 5 to 7). Among them, since the three coefficients bounded by the one-dotted chain line are demanded for obtaining third odd and even coefficients, they are latched in an internal flip-flop.

The lower half of FIG. 12 illustrates a case where coefficients of two columns following the coefficient of the column number 7 in the horizontal direction are additionally input, i.e., where coefficients of three columns (column numbers 7 to 9) are input in the horizontal direction to perform the horizontal lifting computation.

Similar to the second case, in order to obtain the third odd and even coefficients, three coefficients bounded by the thick solid line and coefficients of two columns (encircled column numbers 8 and 9) are demanded. Further, in order to calculate the coefficient of Q2 in step B2, the coefficient of the encircled column number 7 is also demanded.

The three coefficients bounded by the thick solid line in the lower half are latched through the second horizontal lifting computation as shown as the one-dotted chain line in the upper half.

Therefore, it is possible to obtain four coefficients (bounded by the thick dotted line) including the third odd and even coefficients by performing the horizontal lifting computation using the three coefficients bounded by the thick solid line, latched through the second horizontal lifting computation, and the coefficients of three columns (column numbers 7 to 9) that are newly input. Among them, since the three coefficients bounded by the one-dotted chain line are demanded for obtaining fourth odd and even coefficients, they are latched in an internal flip-flop.

Through the aforementioned operation, horizontal synthesis filtering is completed by performing the horizontal lifting computation up to the rightmost column in a screen while coefficients of three columns are sequentially input, and three coefficients are stored for an intermediate computation.

As described above, since the lifting scheme of a 9×7 wavelet transform filter is used even in the vertical and horizontal synthesis filtering processes, a coefficient buffer for storing coefficients of each of three lines is demanded in a buffer having a corresponding division level. In addition, the coefficients of the lines already used in the vertical lifting computation to obtain the coefficients of Q1 and Q2 of FIG. 11 are also demanded in the subsequent vertical lifting computation.

Therefore, the buffer having a corresponding level is internally configured to sequentially transmit the coefficients stored in a single line buffer to the neighboring line buffer.

The baseband image data obtained through synthesis filtering as described above are accumulated in the buffer 122.

In addition, the line-based synthesis filter unit 213 is controlled by the inverse wavelet transform control unit 202 to perform synthesis filtering for the image data prior to the reversible encoding up to a predetermined division level in order to obtain baseband image data compressed with a desired compression rate. That is, the line-based synthesis filter unit 213 does not typically performs the synthesis up to the division level 0. However, the obtained synthesis filtering results are treated as the baseband image data even when the line-based synthesis filter unit 213 performs the synthesis filtering up to whatever division level.

Configuration of Irreversible Encoding Unit

Figure 13:
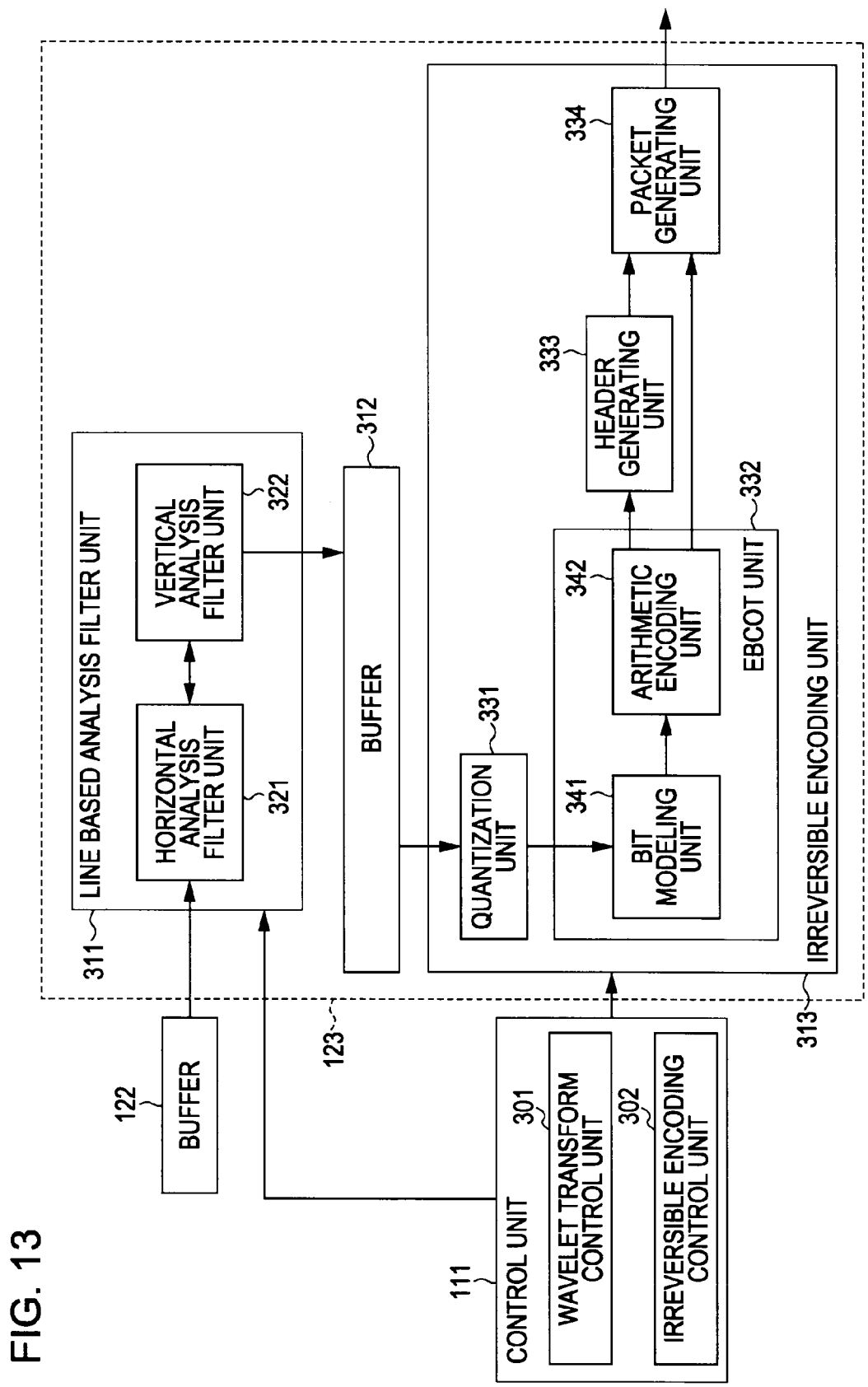
FIG. 13 is a block diagram illustrating an exemplary configuration of an irreversible line-based encoding unit.

Next, an irreversible line-based encoding unit 123 will be described. FIG. 13 is a block diagram illustrating an exemplary configuration of a control unit and an irreversible line-based encoding unit. Referring to FIG. 13, the irreversible line-based encoding unit 123 basically has a configuration similar to that of the reversible line-based encoding unit 101.

That is, the irreversible line-based encoding unit 123 has a line-based analysis filter unit 311 similar to the line-based analysis filter unit 141 of FIG. 2, a buffer 312 similar to the buffer 142 of FIG. 2, and an irreversible encoding unit 313 similar to the reversible encoding unit 143.

The control unit 111 has a wavelet transform control unit 301 which controls the operation of the line-based analysis filter unit 311 and an irreversible encoding unit 302 which controls the operation of the irreversible encoding unit 313.

The line-based analysis filter unit 311 is controlled by the wavelet transform control unit 301 to perform the wavelet transform in each line block for the image data read from the buffer 122. The line-based analysis filter unit 311 has a horizontal analysis filter unit 321 similar to the horizontal analysis filter unit 161 of FIG. 2 and a vertical analysis filter unit 322 similar to the vertical analysis filter unit 162 of FIG. 2.

The horizontal analysis filter unit 321 is controlled by the wavelet transform control unit 301 to perform line-based analysis filtering in the horizontal direction for the image data read from the buffer 122. The vertical analysis filter unit 322 is controlled by the wavelet transform control unit 301 to perform line-based analysis filtering in the vertical direction to supply the obtained processing results to the buffer 312 where they are stored.

The irreversible encoding unit 302 further includes a quantization unit 331 in addition to the configuration of the reversible encoding unit 143. That is, the EBCOT unit 332 corresponds to the EBCOT unit 171. The header generating unit 333 corresponds to the header generating unit 172 of FIG. 2. The packet generating unit 334 corresponds to the packet generating unit 173.

The EBCOT unit 332 has a bit-modeling unit 341 similar to the bit-modeling unit 181 of the EBCOT unit 171 and an arithmetic encoding unit 342 similar to the arithmetic encoding unit 182 of the EBCOT unit 171.

The quantization unit 331 is controlled by the irreversible encoding control unit 302 to quantize the wavelet coefficients obtained from the buffer 312. The quantization method may be arbitrary, but a scalar quantization in which division is performed using a quantization step size is typically used. The quantization unit 331 supplies the quantization coefficient obtained by the quantization to the EBCOT unit 332. In the subsequent stages, the quantization coefficients are supplied instead of the wavelet coefficients. However, basically, these quantization coefficients are treated similar to the wavelet coefficients. Therefore, hereinafter, descriptions of similar elements will be omitted if they are not particularly necessary, and the quantization coefficient will be referred to simply as a coefficient or coefficient data.

The bit-modeling unit 341 performs bit-modeling for the coefficient data according to the sequence specified in the standard to transmit contexts to the arithmetic encoding unit 342. The arithmetic encoding unit 342 performs arithmetic encoding for the bit-plane of the coefficients.

Figure 14:
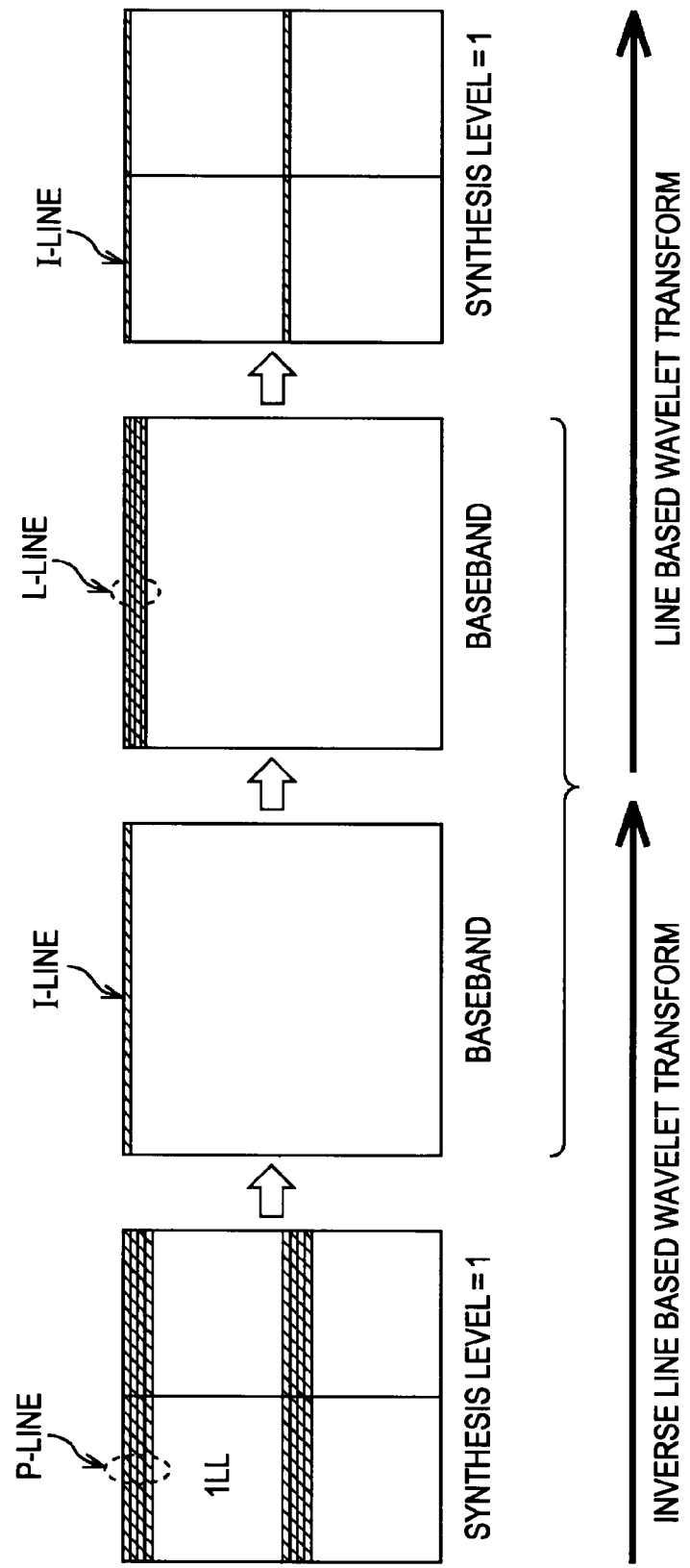
FIG. 14 illustrates a wavelet transform process and an inverse wavelet transform process.

FIG. 14 illustrates the wavelet transform process and the inverse wavelet transform process.

The control unit 111 performs control such that the inverse line-based wavelet transform in the reversible line-based decoding unit 121 and the line-based wavelet transform in the irreversible line-based encoding unit 123 are processed concurrently.

As shown in the left of FIG. 14, the control unit 111 makes the line-based synthesis filter unit 213 execute the inverse line-based wavelet transform whenever a line of the lowest frequency component is stored in a predetermined P-line buffer 212 to generate baseband image data of a single line and store them in the buffer 122. The control unit 111 controls the line-based synthesis filter unit 213 and iterates such an inverse line-based wavelet transform process.

As soon as the baseband image data corresponding to a predetermined number of lines L are accumulated in the buffer 122 by iterating such a process, the control unit 111 allows the line-based analysis filter unit 311 to obtain the baseband image data of L lines as shown in the right side of FIG. 14 and performs the line-based wavelet transform to generate coefficient data for each subband. The control unit 111 controls the line-based analysis filter unit 311 to iterate such a line-based wavelet transform process.

Through the aforementioned control operation, it is possible to minimize the data amount simultaneously accumulated in the buffer 122. Therefore, the control unit 111 can reduce the memory amount demanded in the buffer 122.

Process Flow

Next, each process flow will be described. First, an exemplary process flow of the reversible encoding executed by the reversible line-based encoding unit 101 will be described with reference to the flowchart of FIG. 15.

As the reversible encoding process is initiated, the line-based analysis filter unit 141 is controlled by the wavelet transform control unit 151 to perform wavelet transform for the target line block. In step S102, the EBCOT unit 171 is controlled by the reversible encoding control unit 152 to perform entropy encoding for the wavelet coefficients generated by the process of step S101 to generate a code stream. In step S103, the header generating unit 172 and the packet generating unit 173 are controlled by the reversible encoding control unit 152 to generate a header and further a packet of the code stream. In step S104, the control unit 131 determines whether or not all the line blocks have been processed.

If it is determined that any unprocessed line block exists, and all the line blocks have not been processed, then the process returns to step S101, and subsequent processes are iterated. If it is determined in step S104 that all the line blocks have been processed, then the reversible encoding process is terminated.

The packet generated as described above is supplied to the irreversible transcoding unit 102.

Next, an exemplary process flow of the transcoding control executed by the control unit 111 of the irreversible transcoding unit 102 will be described with reference to the flowchart of FIG. 16.

As the transcoding control process is initiated, in step S121, the decoding control unit 201 controls the decoding unit 211 to decode the code streams until all the processing target code streams are processed. The wavelet coefficients obtained through the decoding are sequentially supplied to and stored in the buffer 212.

In step S122, the inverse wavelet transform control unit 202 controls the line-based synthesis filter unit 213 to perform inverse wavelet transform for the processing target coefficient data until the processing target coefficient data stored in the buffer 212 do not exist. The baseband image data obtained through the inverse wavelet transform are sequentially stored in the buffer 122.

In step S123, the control unit 111 determines whether or not the image data for a single line block have been accumulated in the buffer 122 and stands by until it is determined that the image data for a single line block are accumulated.

If it is determined that the image data for a single line block are accumulated in the buffer 122, then the process advances to step S124. In step S124, the wavelet transform control unit 301 controls the line-based analysis filter unit 311 to read the line blocks accumulated in the buffer 122 and perform the wavelet transform. The coefficients obtained through the encoding are sequentially supplied to and stored in the buffer 312.

In step S125, the irreversible encoding control unit 302 controls the irreversible encoding unit 123 to read the wavelet coefficients accumulated in the buffer 312 to perform the irreversible encoding. The code streams obtained through the process of step S125 are packetized and output to the outside of the encoding device 100.

In step S126, the control unit 111 determines whether or not unprocessed image data exist in the buffer 122. If it is determined that there is unprocessed image data, then the process returns to step S123, and the subsequent processes are iterated. If it is determined in step S126 that unprocessed image data do not exist in the buffer 122, then the transcoding control process is terminated.

Next, an exemplary process flow of the decoding executed by the control of step S121 of FIG. 16 will be described with reference to the flowchart of FIG. 17.

As the decoding process is initiated, the packet translation unit 231 obtains a predetermined amount of code streams in step S141. In step S142, the EBCOT unit 232 performs entropy decoding for the obtained code streams. In step S143, the buffer 121 stores the coefficients obtained through process of step S142. If the process of step S143 is terminated, the decoding process is completed.

Next, an exemplary process flow of the inverse wavelet transform executed by the control of step S122 of FIG. 16 will be described with reference to FIG. 18.

As the inverse wavelet transform is initiated, the line-based synthesis filter unit 213 determines whether or not a predetermined number of coefficients have been accumulated in the buffer 212 in step S161 and stands by until it is determined that a predetermined number of coefficients are accumulated. If it is determined that a predetermined number of coefficients have been accumulated in the buffer 212, the process advances to step S162.

In step S162, the line-based synthesis filter unit 213 obtains the coefficients stored in the buffer 212. In step S163, the line-based synthesis filter unit 213 performs a synthesis filtering process for the obtained coefficients. In step S164, the line-based synthesis filter unit 213 supplies the image data obtained in step S163 to the buffer 122 where they are stored. If the process of step S164 is terminated, then the inverse wavelet transform process is completed.

Next, an exemplary process flow of the wavelet transform executed by the control of step S124 of FIG. 15 will be described with reference to the flowchart of FIG. 19.

As the wavelet transform process is initiated, in step S181, the line-based analysis filter unit 311 obtains the processing target line block accumulated in the buffer 122. In step S182, the line-based analysis filter unit 311 performs the analysis filter process for the obtained line block. In step S183, the line-based analysis filter unit 311 supplies the coefficient data generated through the process of step S182 in the buffer 312 where they are stored. If the process of step S183 is terminated, then the wavelet transform process is terminated.

Figure 20:
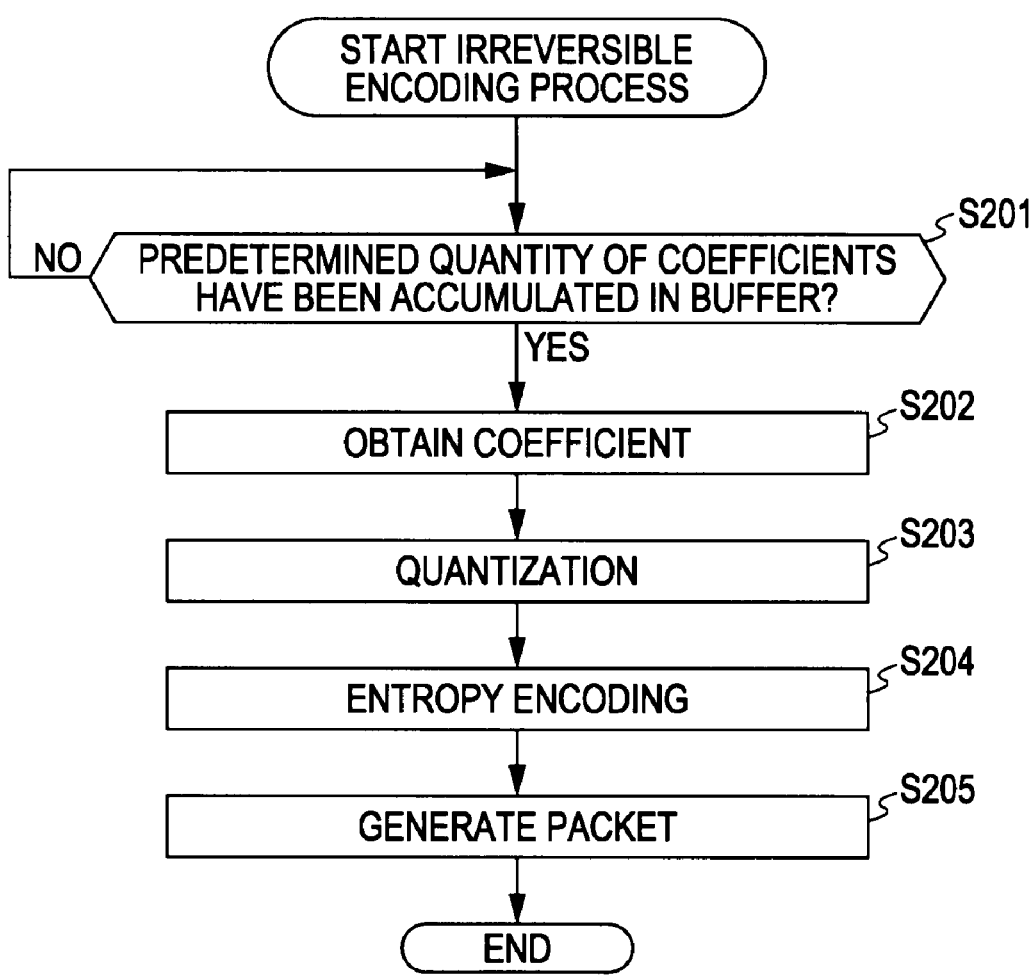
FIG. 20 is a flowchart illustrating an example of an irreversible encoding process flow.

Next, an exemplary process flow of the irreversible encoding executed by the control of step S125 of FIG. 15 will be described with reference to the flowchart of FIG. 20.

As the irreversible encoding process is initiated, in step S201, the irreversible encoding unit 313 determines whether or not a predetermined number of coefficients have been accumulated in the buffer 312 and stands by until it is determined that a predetermined number of coefficients are accumulated. If it is determined that a predetermined number of coefficients have been accumulated in the buffer 312, then the process advances to step S202.

In step S202, the irreversible encoding unit 313 obtains coefficient data from the buffer 312. In step S203, the quantization unit 331 quantizes the obtained coefficient data. In step S204, the EBCOT unit 332 performs entropy encoding for the quantized coefficients to generate a code stream encoded using an irreversible scheme. In step S205, the header generating unit 333 and the packet generating unit 334 generate a header of the code stream obtained through the process of step S204 and further a packet using the header and output it. If the process of step S205 is terminated, the irreversible encoding process is completed.

Figure 15:
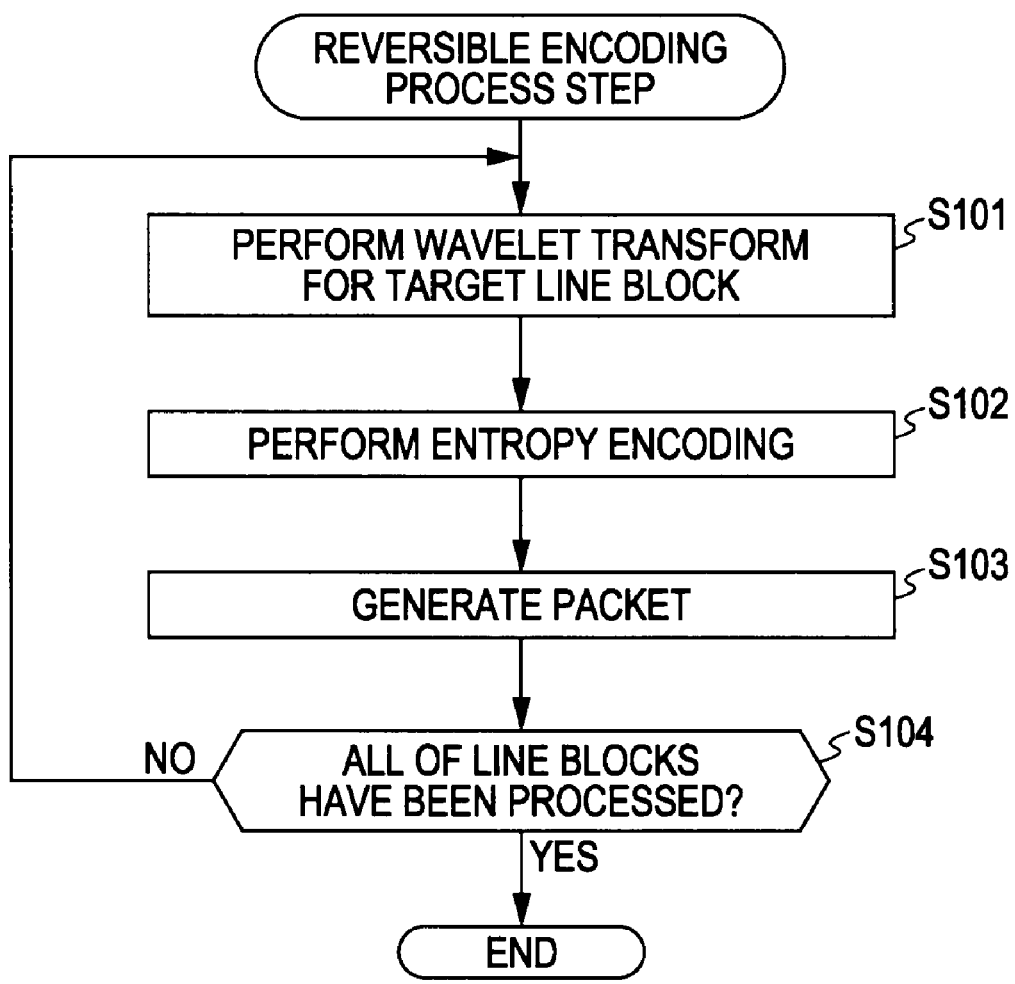
FIG. 15 is a flowchart illustrating an example of a reversible encoding process flow.
Figure 18:
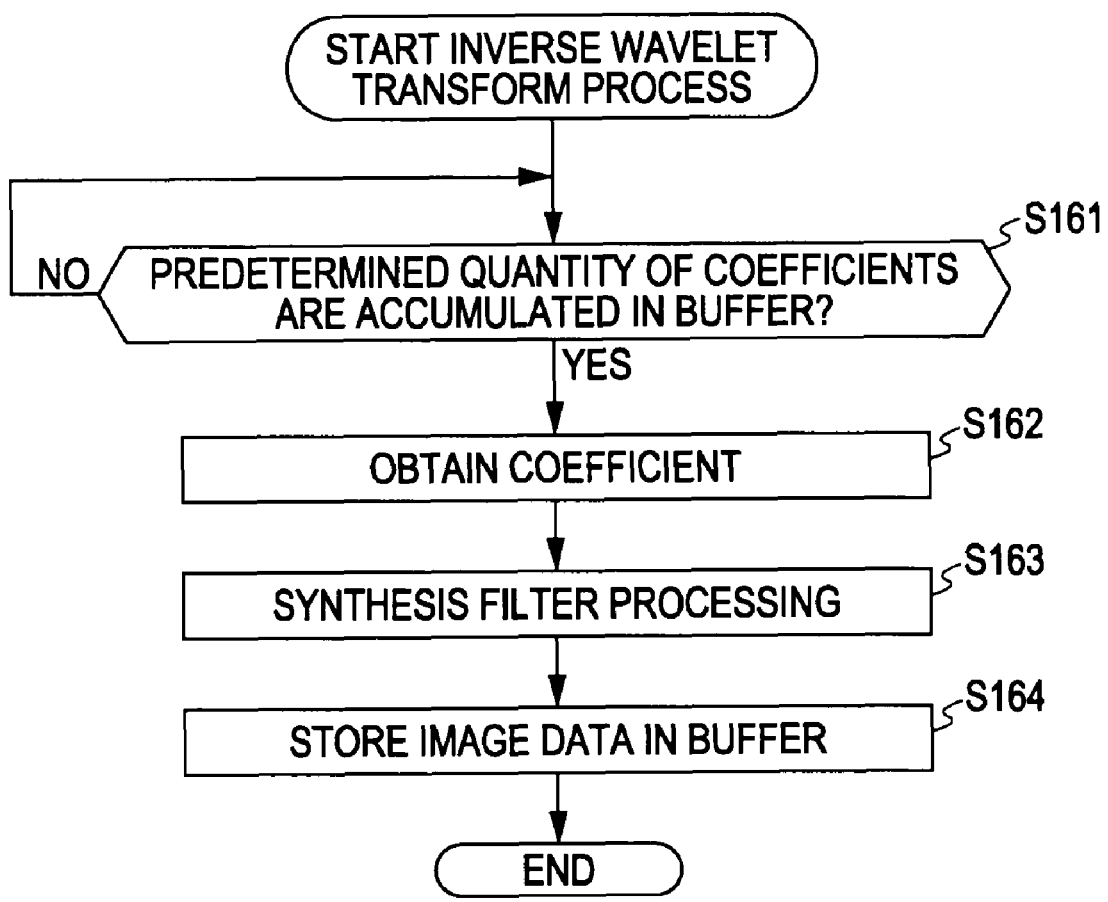
FIG. 18 is a flowchart illustrating an example of an inverse wavelet transform process flow.
Figure 19:
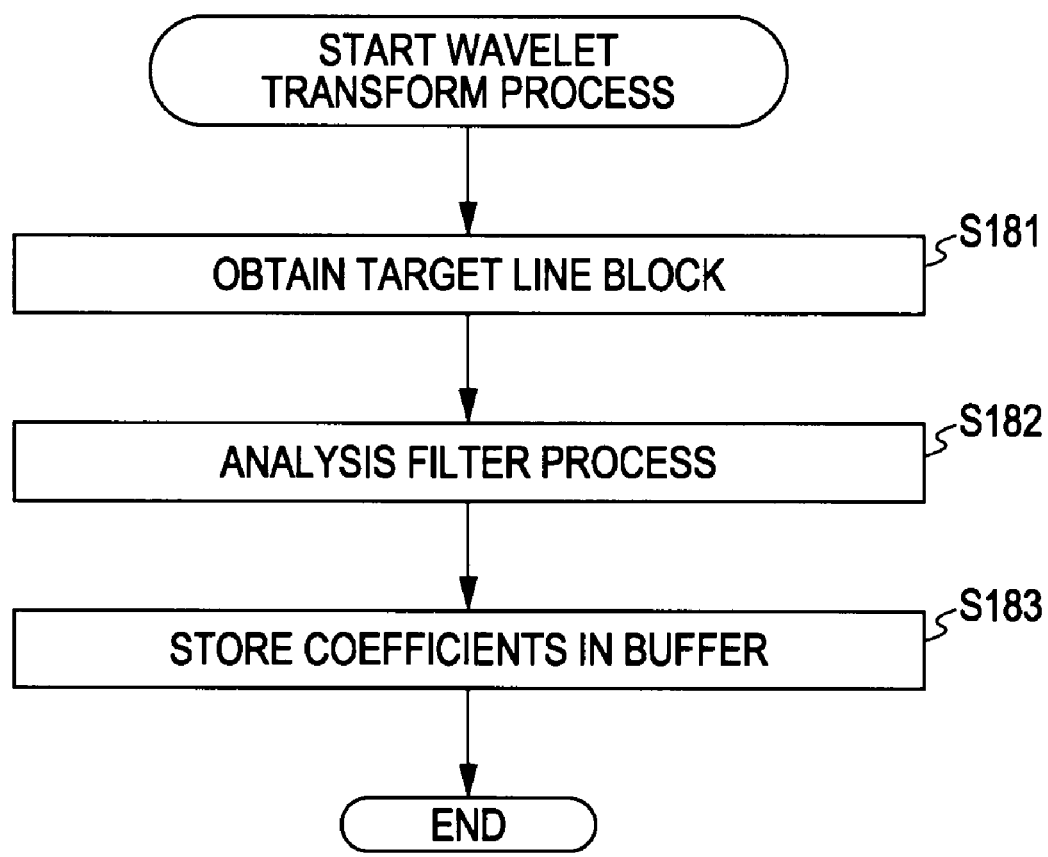
FIG. 19 is a flowchart illustrating an example of a wavelet transform process flow.

As described above, under the control of the control unit 111 for the transcoding control process described in conjunction with the flowchart of FIG. 15, the inverse wavelet transform process described in conjunction with FIG. 18 and the wavelet transform process described in conjunction with FIG. 19 are concurrently (independently) executed.

In this case, the control unit 111 executes the wavelet transform process as soon as the image data generated through the inverse wavelet transform process are accumulated in the buffer 122 as much as a requisite minimum amount. Therefore, the encoding device 100 can reduce the memory amount demanded in the buffer 122.

Any encoding (or decoding) scheme may be employed in the encoding (or decoding) process executed by each unit including the reversible line-based encoding unit 101, the reversible line-based decoding unit 121, and the irreversible line-based encoding unit 123. For example, the JPEG2000 scheme may be employed.

2. Second Embodiment

Configuration of Reversible Encoding Unit

Figure 21:
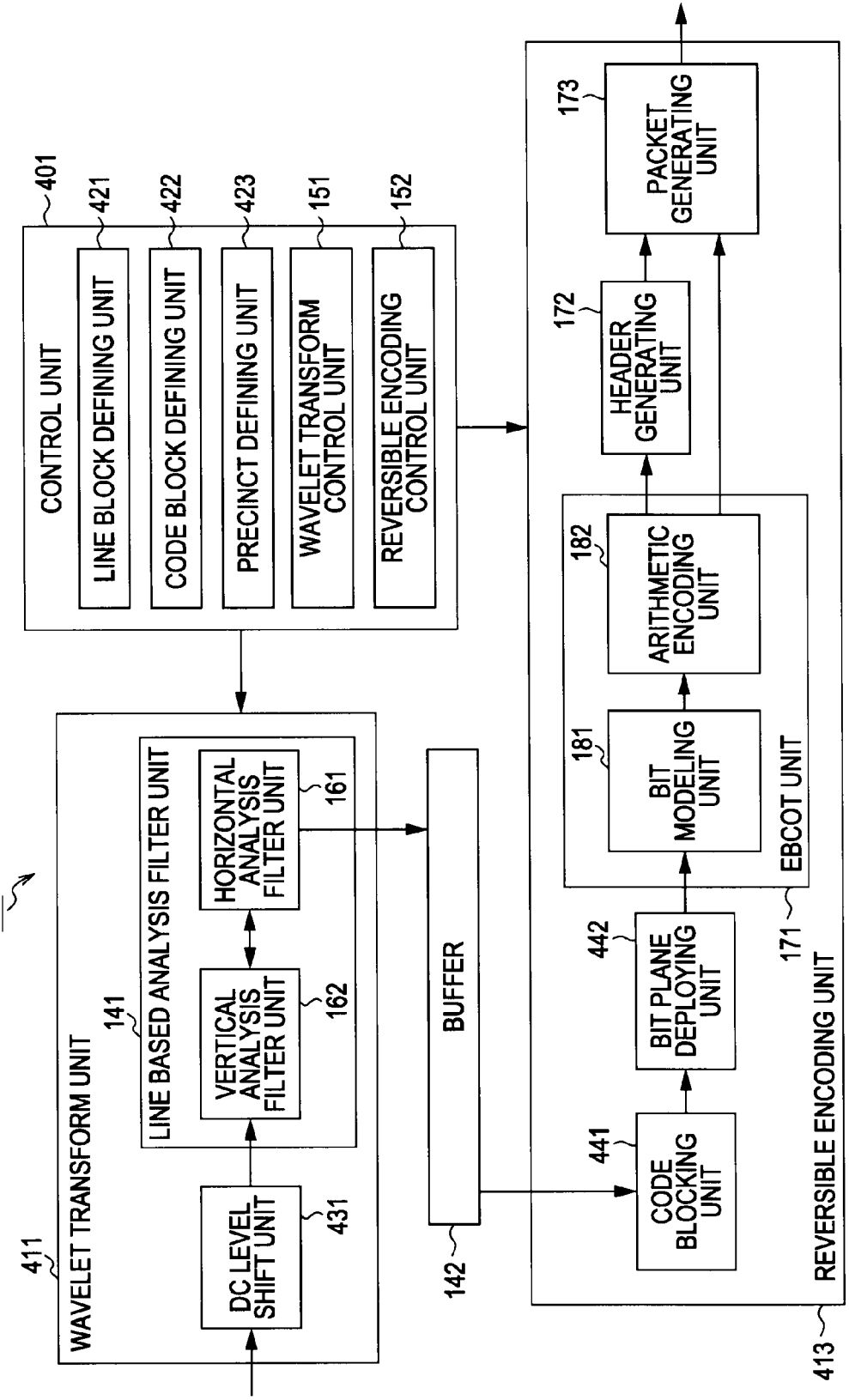
FIG. 21 is a block diagram illustrating another exemplary configuration of the reversible line-based encoding unit.

A reversible line-based encoding unit in a case where the JPEG2000 is used as the encoding scheme will be described. FIG. 21 is a block diagram illustrating another exemplary configuration of the reversible line-based encoding unit.

Also in this case, while the reversible line-based encoding unit 101 has basically the same configuration as described in conjunction with FIG. 2, the control unit 131, the line-based analysis filter unit 141, and the reversible encoding unit 143 are substituted with a control unit 401, a wavelet transform unit 411, and a reversible encoding unit 413, respectively.

The wavelet transform unit 411 has a DC-level shift unit 431 and a line-based analysis filter unit 141. The DC-level shift unit 431 performs level-shifting for the DC components of the image data input to the wavelet transform unit 411 in order to effectively perform the line-based analysis filtering in the subsequent stages. For example, an RGB signal has a positive value (unsigned integer). The DC-level shift unit 431 performs level-shifting for dividing a dynamic range of an original signal into halves based on this property to improve a compression rate. Therefore, similar to a Cb or Cr component of the YCbCr signal (a color difference signal), the original signal has a signed integer value (in both positive and negative signs), this level-shifting is not applied.

The line-based analysis filter unit 141 performs a wavelet transform process for the image data of which the DC-levels have been shifted.

The reversible encoding unit 413 is controlled by the reversible encoding control unit 152 to encode wavelet coefficients based on the reversible encoding scheme of the JPEG2000. The reversible encoding unit 413 further includes a code blocking unit 441 and a bit-plane deployment unit 442 in addition to the EBCOT unit 171 and the packet generating unit 173.

Figure 22:
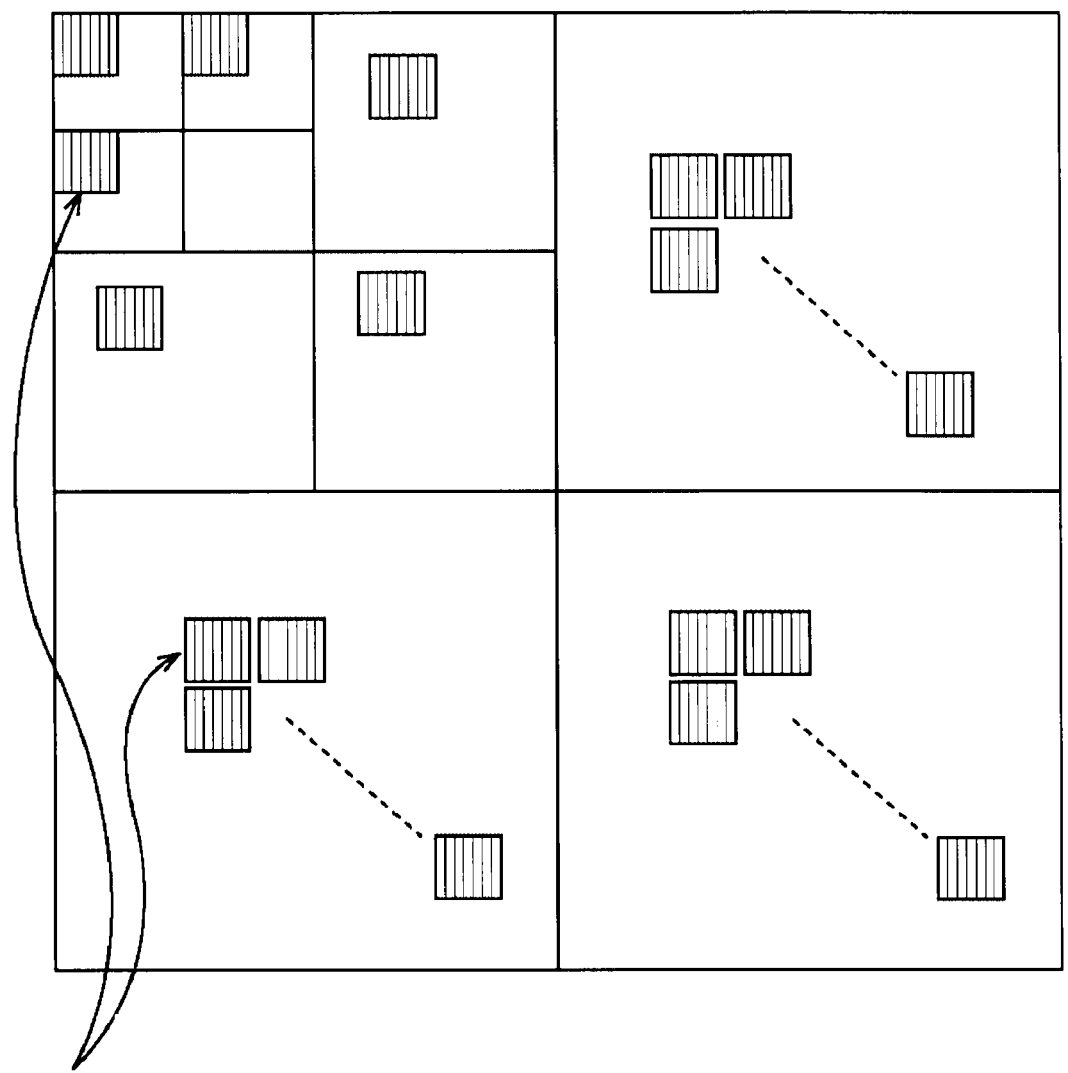
FIG. 22 illustrates code blocks.

The code blocking unit 441 divides the code stream into code blocks having a predetermined size which is processing unit of the entropy encoding. FIG. 22 illustrates a positional relationship of the code blocks in each subband. For example, code blocks having a size of approximately 64×64 pixels are generated in all the subbands after the division. In the example of FIG. 22, assuming that the size of the subband 3HH which has the smallest division level is, for example, 640×320 pixels, a total of 50 code blocks of 64×64 pixels exist. Each processing section in the subsequent stages performs this process for each code block.

The code blocking unit 441 supplies each code block to the bit-plane deployment unit 442. The bit-plane deployment unit 205 deploys the coefficient data on a bit-plane for each bit position. The bit-plane is obtained by dividing (slicing) a coefficient group including a predetermined number of wavelet coefficients for each bit, i.e., for each position. That is, the bit-plane is a set of bits (coefficient bits) of the same position in that coefficient group.

The EBCOT unit 171 performs entropy encoding for the coefficient data for which the bit-plane has been deployed.

The control unit 401 further includes a line block defining unit 421, a code block defining unit 422, and a precinct defining unit 423 in addition to the wavelet transform control unit 151 and the reversible encoding control unit 152.

The code block defining unit 422 defines the size of the code block specified in the JPEG2000. The precinct defining unit 423 defines the size of the precinct specified in the JPEG2000.

In the case of the JPEG2000, the code block defining unit 422 defines a rectangular code block (e.g., 64×64) within the subband obtained after the wavelet transform as shown in FIG. 22. The horizontal size (CB_h) and the vertical size (CB_v) of the code block are defined based on the following equations.

$$xcb' = \min(xcb, PPx-1), \text{ for } r>0 \quad (9)$$

$$xcb' = \min(xcb, PPx), \text{ for } r=0 \quad (10)$$

$$ycb' = \min(ycb, PPy-1), \text{ for } r>0 \quad (11)$$

$$ycb' = \min(ycb, PPy), \text{ for } r=0 \quad (12)$$

where, r denotes a resolution level number, and r=0 means a lowest frequency component.

$$CB\_h(\text{a horizontal size of the code block}) = 2^{xcb'} \quad (13)$$

$$CB\_v(\text{a vertical size of the code block}) = 2^{ycb'} \quad (14)$$

$$PR\_h(\text{a horizontal size of the precinct}) = 2^{PPx} \quad (15)$$

$$PR\_v(\text{a vertical size of the precinct}) = 2^{PPy} \quad (16)$$

Figure 23:
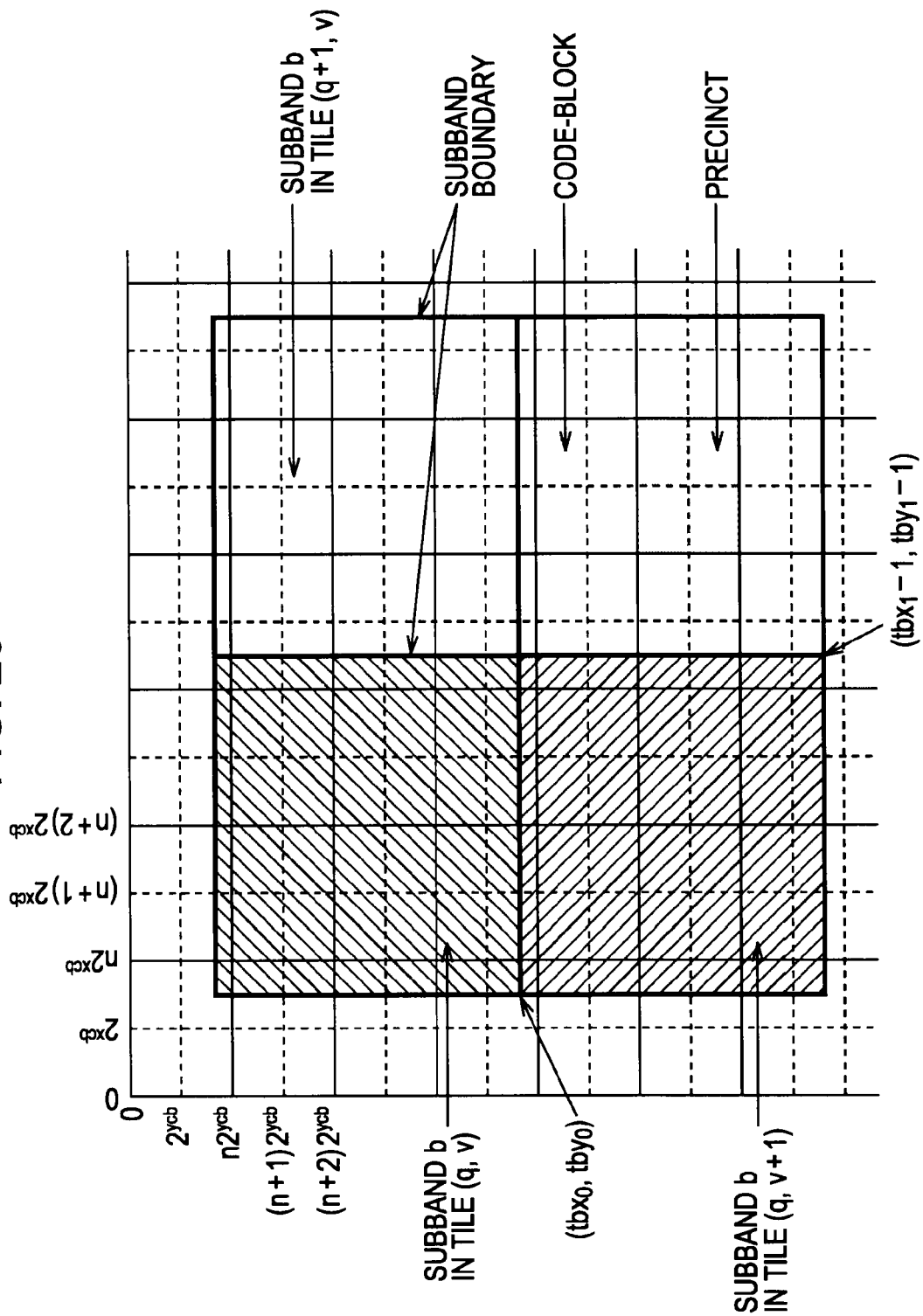
FIG. 23 illustrates code blocks and precincts.

In the descriptions above, it may be necessary to define the code block within the precinct according to the JPEG2000. FIG. 23 illustrates such a relationship which is also disclosed in a specification of the JPEG2000, Part 1. In FIG. 23, thick-lined rectangles denote boundaries of the subbands, and gray rectangular areas denote precincts. In addition, rectangular blocks having a minimum unit size denote code blocks.

Figure 24:
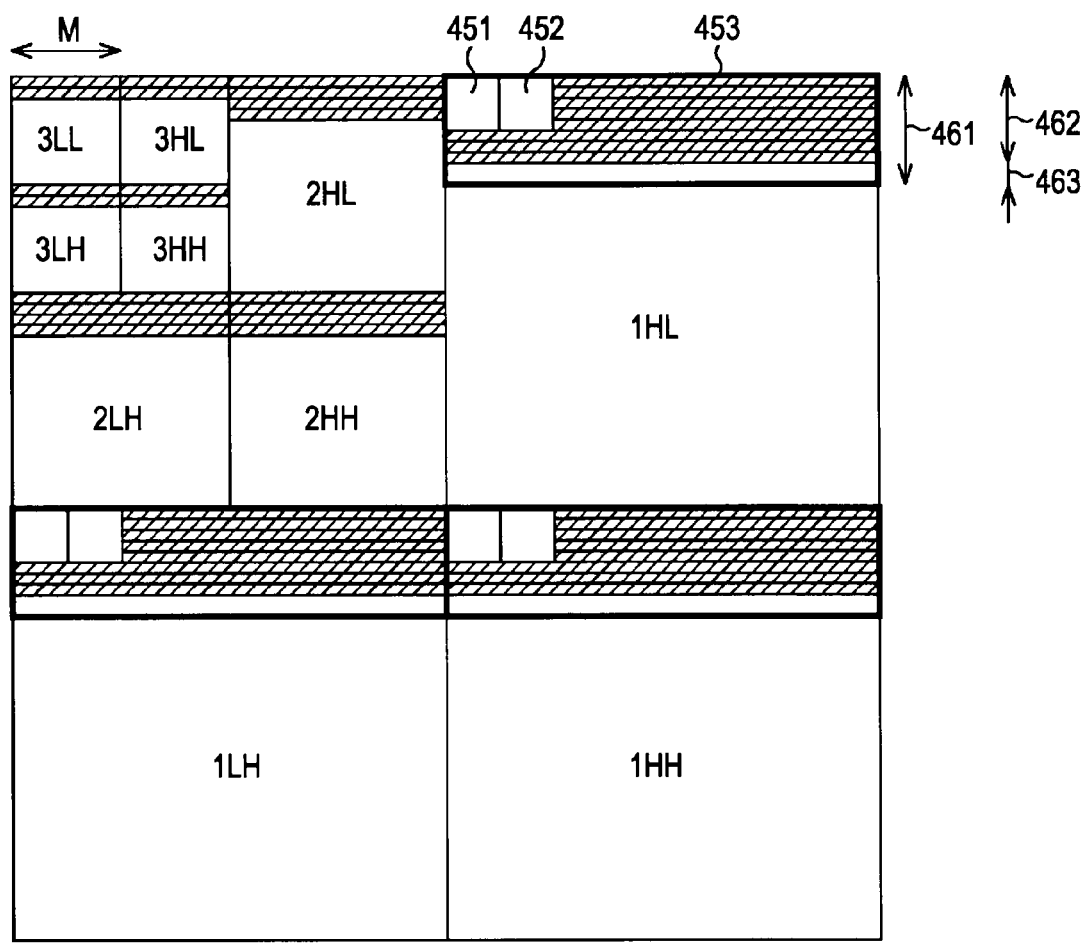
FIG. 24 illustrates a process of stuffing a line block.

In the JPEG2000, it may be necessary to confirm the code block size and the precinct size at the time of the encoding. For example, a relationship between code block and the precinct can be defined as shown in FIG. 24 in the course of the line-based wavelet transform. However, as described above, there is a limitation that whatever size be a power of two.

Therefore, it may be necessary to provide a countermeasure for a case where the precinct size of 1HL, 1HH, or 1LH is not a power of two when the coefficient of a single line having the lowest frequency component 3LL in FIG. 24 is generated. This is achieved by stuffing a part of the precinct ranged out of the line group of the line block as soon as a line group of the subsequent line block is obtained. This operation is similarly applied to all other subbands.

In the aforementioned descriptions, the sequence of the horizontal analysis filtering and the vertical analysis filtering has not been particularly described. In the JPEG2000 standard, it is specified that vertical analysis filtering is executed first, and then, horizontal analysis filtering is executed.

However, other than the JPEG2000, when there is no concern in standards the sequence of the filtering is not limited. Therefore, for example, in order to execute filtering as soon as a single line of the baseband image is input, the horizontal analysis filtering may be executed as soon as M columns of the baseband image are input. In turn, the vertical analysis filtering is executed as soon as the coefficients of N lines are collected in the vertical direction so that four subbands are generated. In this case, since there is no delay as much as L lines, it is possible to execute filtering with little delay.

Next, a method of determining a compression rate when the reversible line-based encoding unit 101 of FIG. 1 performs encoding according to the JPEG2000 standard will be described. As described above, in the JPEG2000, since the EBCOT encoding is executed on a code block basis, the compression rate may be reduced when the code block size is small. Therefore, in the JPEG2000, 32×32 or 64×64 pixels are typically used.

However, if a single precinct is formed by "1 line×M columns (the horizontal size)" such as 3LL, 3HL, 3LH, and 3HH of FIG. 24, the compression rate significantly worsens because the size of the code block is smaller than this. Therefore, it can be said that there is a tradeoff between the memory saving and the compression rate.

Meanwhile, if the number of lines N is set to a value larger than 1, then the number of lines in other subbands constituting the line block increases. Therefore, it is allowed to set a larger precinct size and a larger code block size. Therefore, if the compression rate in the encoding is high, it is preferable to increase the number of lines N. On the contrary, if the compression rate in the encoding is low, it is preferable to reduce the number of lines N.

Since the line block defining unit 421 improves the encoding compression rate by allowing the precinct size or the code block size to increase, it is preferable to set the line block size as large as possible considering the memory capacity demanded in the processing.

Configuration of Reversible Decoding Unit

Figure 25:
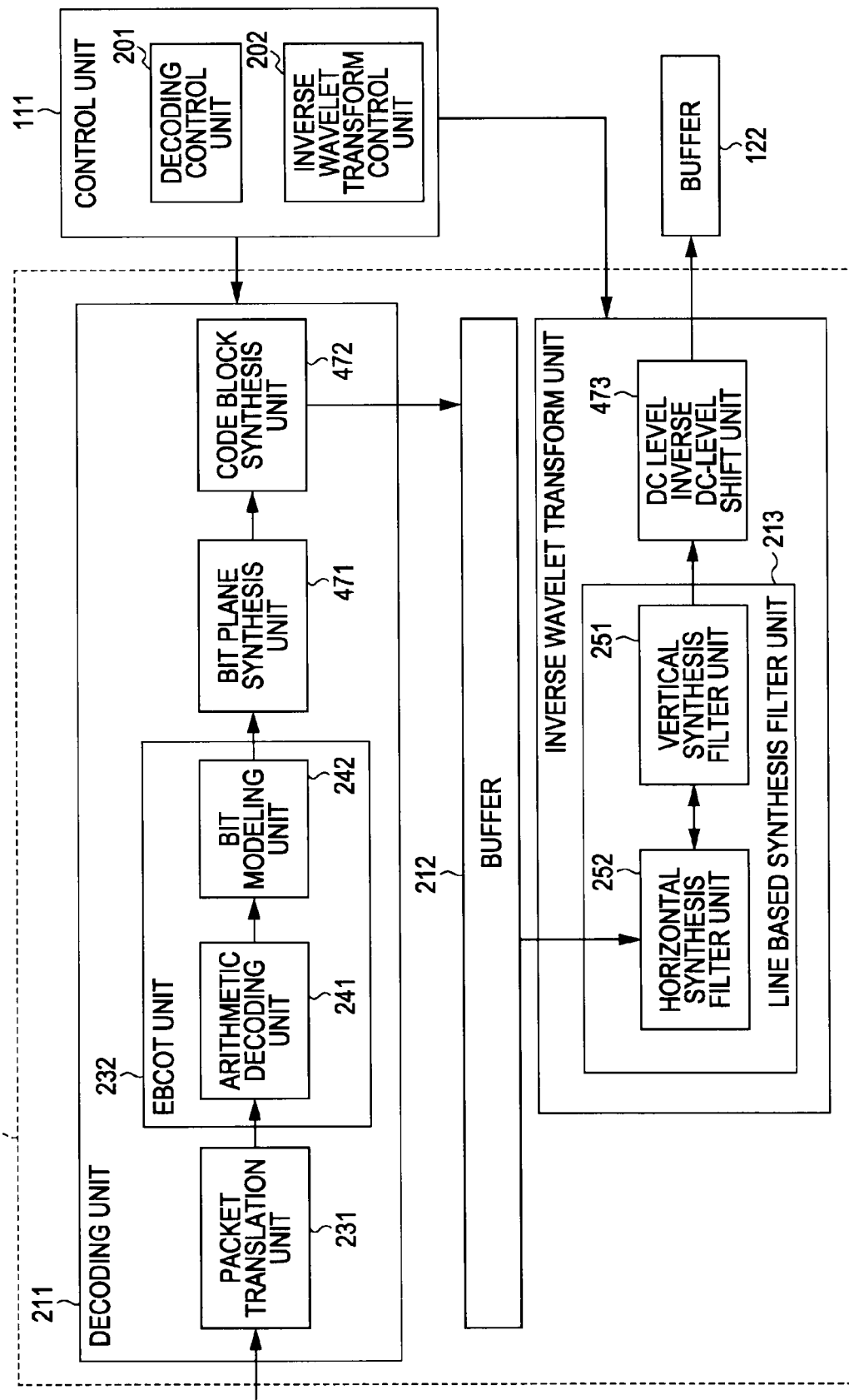
FIG. 25 is a block diagram illustrating another exemplary configuration of the reversible line-based decoding unit.

Next, a configuration of the reversible line-based decoding unit in this case will be described. FIG. 25 is a block diagram illustrating another exemplary configuration of the reversible line-based decoding unit.

Referring to FIG. 25, the decoding unit 211 of the reversible line-based decoding unit 121 in this case further includes a bit-plane synthesis unit 471 and a code block synthesis unit 472 in addition to the configuration of FIG. 8.

The bit-plane synthesis unit 471 synthesizes the wavelet coefficients deployed on the bit-plane. The bit-plane synthesis unit 471 supplies the wavelet coefficients obtained by synthesizing the bit-plane to the code block synthesis unit 472.

The code block synthesis unit 472 generates coefficient data on a code block basis using the supplied bit-plane and further synthesizes the coefficient data to generate coefficient data of each subband. The code block synthesis unit 472 supplies the results to the buffer 212, where they are stored.

In addition, the memory size necessary to perform the inverse line-based wavelet transform in the line-based synthesis filter unit 213 after the EBCOT decoding of the JPEG2000 is executed in the decoding unit 211 depends on the number of lines N having the lowest frequency in the line block in the EBCOT unit.

That is, if the number of lines N is large, then the number of lines in other subbands included in the line block increases, and the demanded memory size is also increased. On the contrary, if the number of lines N is small, then the demanded memory size is accordingly reduced. Therefore, the number of lines N may be determined based on an allowable memory capacity in a system or hardware.

Configuration of Irreversible Encoding Unit

Figure 26:
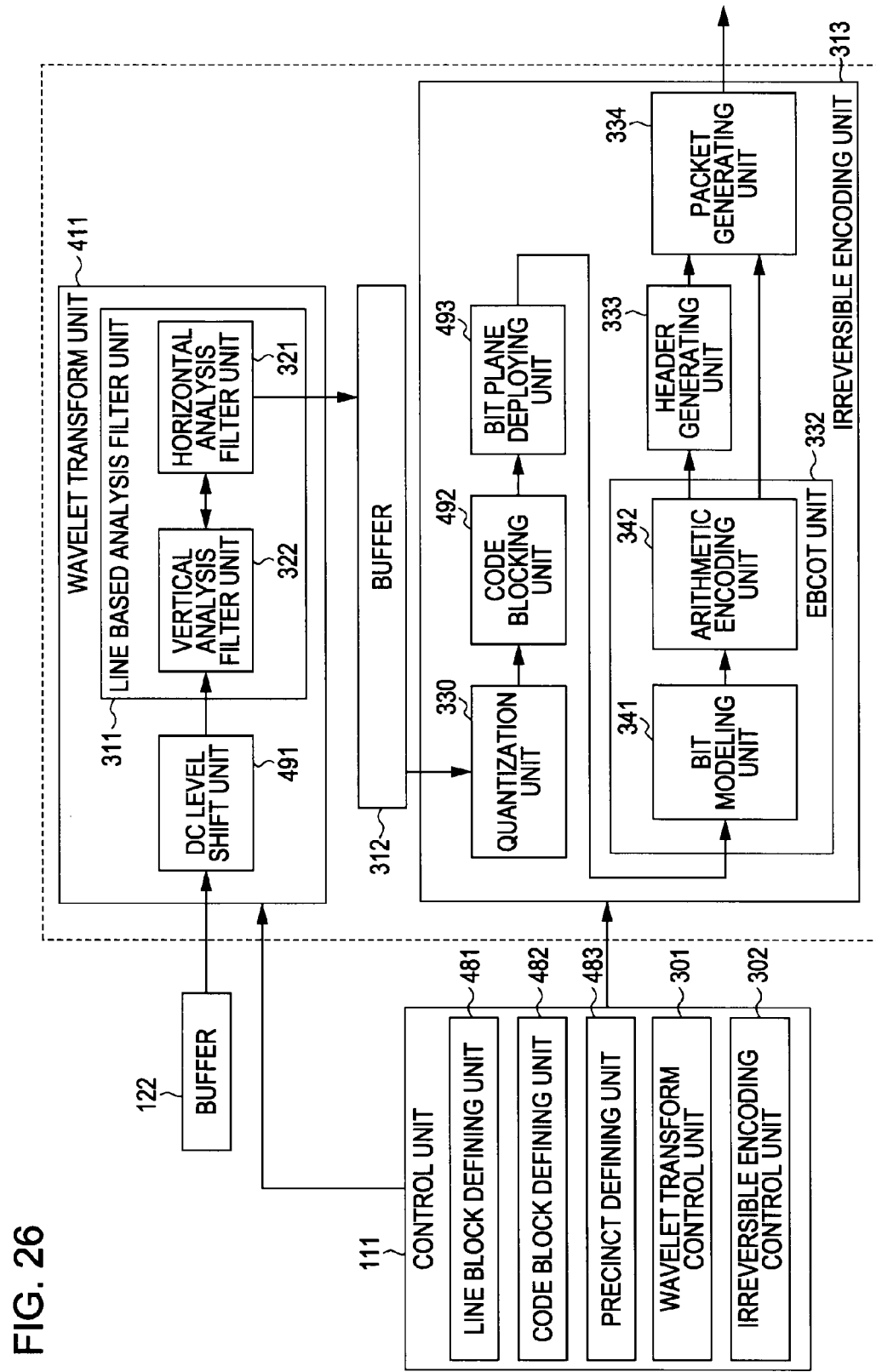
FIG. 26 is a block diagram illustrating another exemplary configuration of the irreversible line-based encoding unit.

Next, a configuration of the irreversible line-based encoding unit in this case will be described. FIG. 26 is a block diagram illustrating another exemplary configuration of the irreversible line-based encoding unit.

Referring to FIG. 26, the irreversible line-based encoding unit 123 in this case includes a wavelet transform unit 490 instead of the line-based wavelet analysis filter unit 311 of FIG. 13. The wavelet transform unit 490 has a DC-level shift unit 491 and a line-based analysis filter unit 311.

Basically similar to the DC-level shift unit 431, the DC-level shift unit 491 shifts the DC-levels of the image data obtained from the buffer 122 and supplies the results to the line-based analysis filter unit 311. The line-based analysis filter unit 311 performs wavelet transform for the image data resulted from the DC-level shift and stores wavelet coefficients of each subband in the buffer 312.

The irreversible encoding unit 313 has a code blocking unit 492 and a bit-plane deployment unit 493 in addition to the configuration of FIG. 13. The code blocking unit 492 divides the quantized coefficient data supplied from the quantization unit 331 into code blocks having a size defined by the code block defining unit 482. The bit-plane deployment unit 493 deploys the coefficient data divided into the code blocks on a bit-plane. The EBCOT unit 332 encodes the coefficient data deployed on the bit-plane.

The control unit 111 has a line block defining unit 481, a code block defining unit 482, and a precinct defining unit 483 in addition to the wavelet transform control unit 301 and the irreversible encoding control unit 302 of FIG. 13.

The code block defining unit 482 defines the code block size specified in the JPEG2000. The precinct defining unit 483 defines the precinct size specified in the JPEG2000.

Also in the case of the irreversible line-based encoding unit 123, it may be necessary to provide a countermeasure for a case where the precinct sizes of 1HL, 1HH, and 1LH are not a power of two when the coefficient of a single line having the lowest frequency component 3LL is generated. This is achieved by stuffing a part of the precinct ranged out of the line group of the line block as soon as a line group of the subsequent line block is obtained. Further, this operation is similarly applied to all other subbands.

In the aforementioned description, the sequence of the horizontal analysis filtering and the vertical analysis filtering has not been particularly described. In the JPEG2000 standard, it is specified that the vertical analysis filtering is executed first, and then, the horizontal analysis filtering is executed.

However, when there is no concern in standards other than the JPEG2000, the sequence of the filtering is not limited. Therefore, for example, in order to execute the filtering as soon as a single line of the baseband image is input, the horizontal analysis filtering may be executed as soon as M columns of the baseband image are input. In turn, the vertical analysis filtering is executed as soon as the coefficients of N lines are collected in the vertical direction so that four subbands are generated. In this case, since there is no delay as much as L lines, it is possible to execute the filtering with little delay.

Since the line block defining unit 481 improves the encoding compression rate by allowing the precinct size or the code block size to increase, it is preferable to set the line block size (the number of lines) as large as possible considering the memory capacity demanded in the processing.

Process Flow

Next, an example of various process flows when the JPEG2000 is used as the encoding scheme will be described. First, an exemplary process flow of the reversible encoding in the reversible line-based encoding unit 101 will be described with reference to the flowchart of FIG. 27.

As the reversible encoding process is initiated, the line block defining unit 421 defines the line block size in step S301. In step S302, the code block defining unit 422 defines the code block size. In step S303, the precinct defining unit 423 defines the precinct size.

In step S304, the wavelet transform unit 411 obtains the target line block. In step S305, the DC-level shift unit 431 shifts the DC-levels of the obtained line block. In step S306, the line-based analysis filter unit 141 performs analysis filtering for the target line block. In step S307, the line-based analysis filter unit 141 supplies the coefficient data resulted from the analysis filtering to the buffer 142 where they are stored.

In step S308, the reversible encoding unit 413 determines whether or not the coefficient data have been accumulated in the buffer 142 as much as one or more precincts. If it is determined that the coefficient data are not accumulated, then the process returns to step S304, and subsequent processes are iterated.

If it is determined in step S308 that the coefficient data are accumulated in the buffer 142 as much as one or more precincts, then the process advances to step S309.

In step S309, the code blocking unit 441 performs code blocking for the coefficient data. In step S310, the bit-plane deployment unit 442 deploys the coefficient data for each code block on a bit-plane. In step S311, the EBCOT unit 171 performs entropy encoding for the coefficient data deployed on the bit-plane.

In step S412, the packet generating unit 173 generates a packet of the code streams generated by the entropy encoding.

In step S313, the control unit 401 determines whether or not all the line blocks have been processed. If it is determined that any unprocessed line block exists, then the process returns to step S304, and the subsequent processes are iterated.

If it is determined in step S313 that all the line blocks have been process, then the reversible encoding process is terminated.

Figure 16:
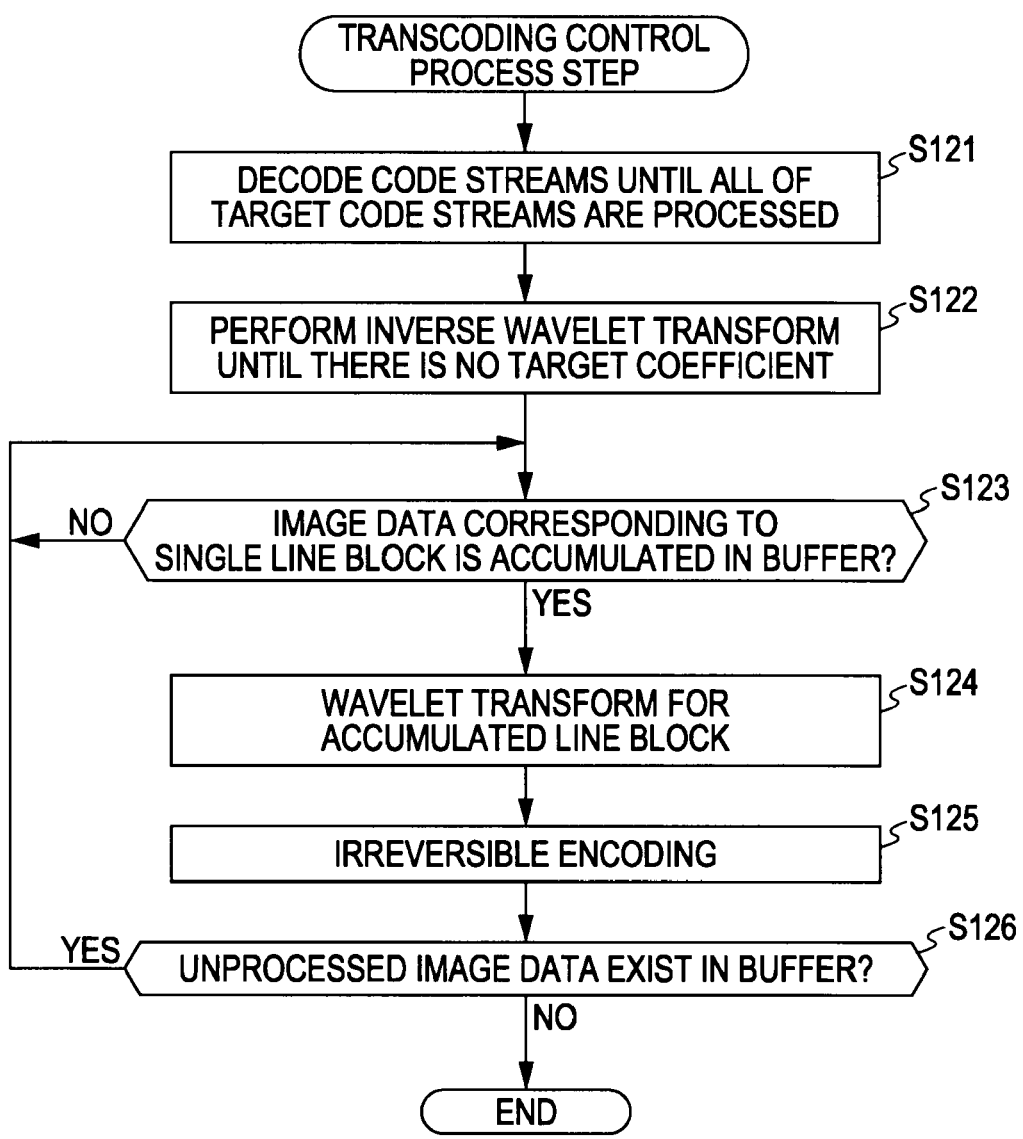
FIG. 16 is a flowchart illustrating an example of a transcoding control process flow.
Figure 17:
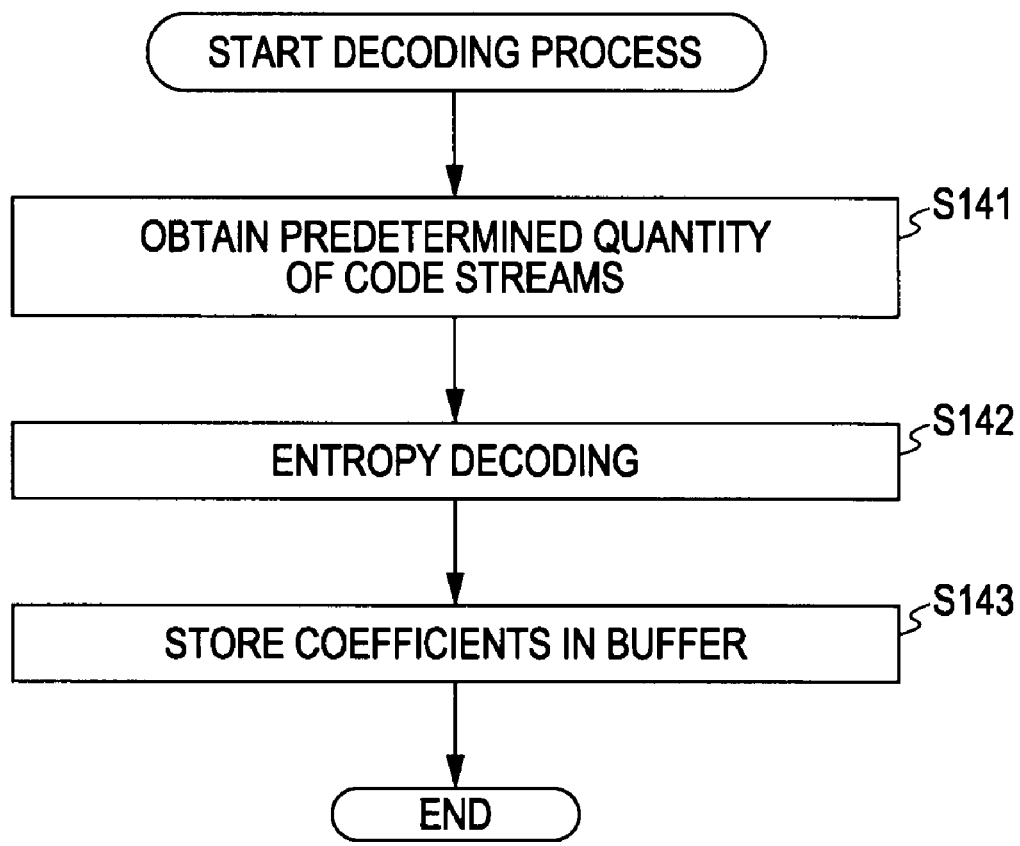
FIG. 17 is a flowchart illustrating an example of a decoding process flow.

Also in this case, the transcoding control process flow is basically the same as that has been described in conjunction with FIG. 16, and a description thereof will be omitted.

Figure 28:
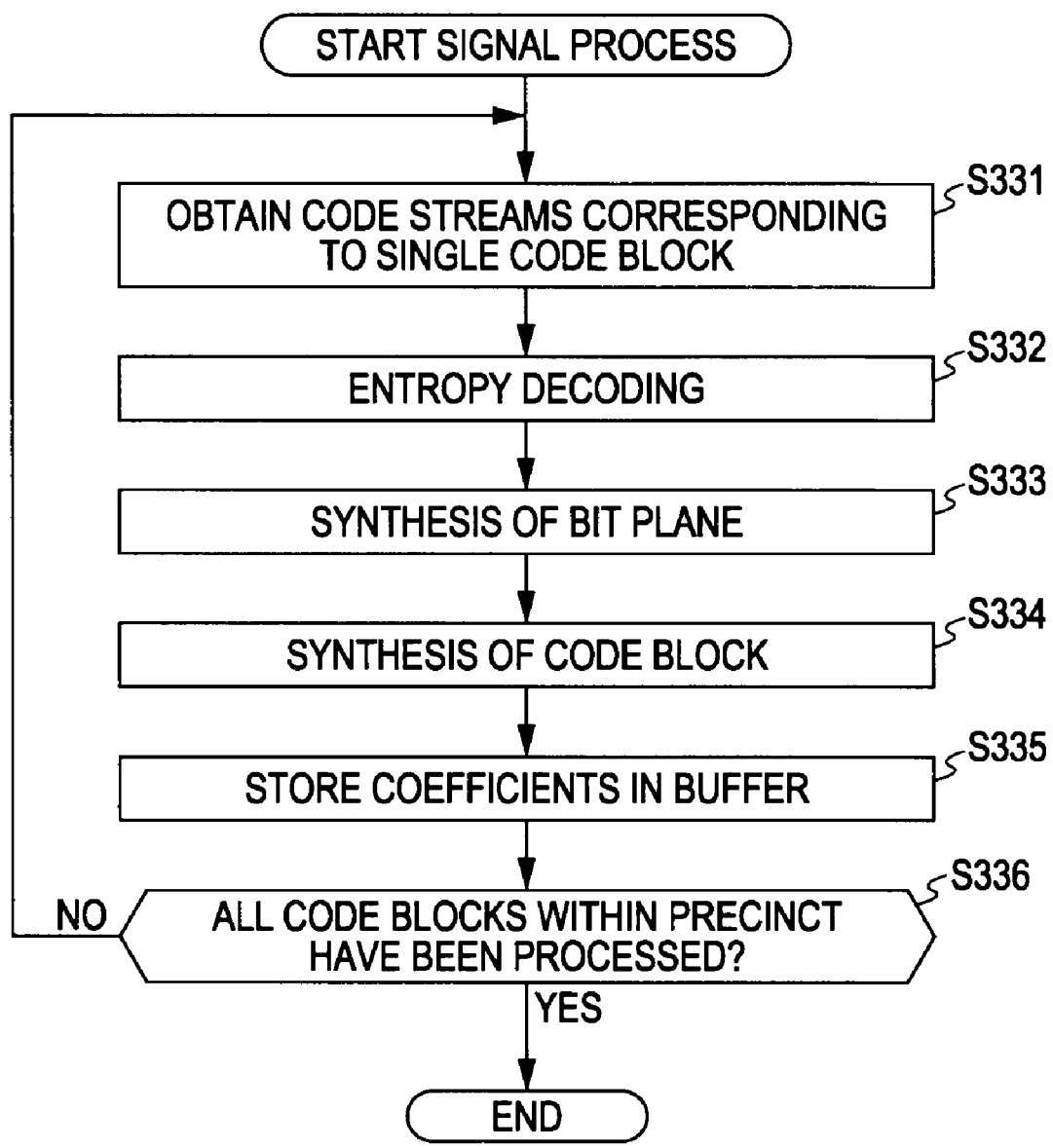
FIG. 28 is a flowchart illustrating an example of a decoding process flow.

An exemplary process flow of the decoding controlled and executed by the process of step S121 of FIG. 16 in this case will be described with reference to the flowchart of FIG. 28.

As the decoding process is initiated, in step S331, the packet translation unit 231 obtains the code streams corresponding to a single code block. In step S332, the EBCOT unit 232 performs entropy decoding for the obtained code streams. In step S333, the bit-plane synthesis unit 471 synthesizes a bit-plane for the decoding results. In step S334, the code block synthesis unit 472 synthesizes the code block of the coefficient data for which the bit-plane has been synthesized. In step S335, the code block synthesis unit 472 supplies the coefficient data, for which the code block has been synthesized, to the buffer 212, where they are stored.

In step S336, the control unit 111 determines whether or not all the code blocks within the precinct have been processed. If it is determined that any unprocessed code block exists, then the process returns to step S331, and the subsequent processes are iterated.

If it is determined in step S336 that all the code blocks within the precinct have been processed, then the decoding process is terminated.

Next, an exemplary process flow of the inverse wavelet transform executed by the control of step S122 of FIG. 16 will be described with reference to the flowchart of FIG. 29.

As the inverse wavelet transform process is initiated, the line-based synthesis filter unit 213 determines whether or not the coefficients corresponding to a single precinct have been accumulated in the buffer 212, in step S351, and stands by until it is determined that the coefficients corresponding to a single precinct are accumulated.

If it is determined that the coefficients corresponding to a single precinct have been accumulated in the buffer 212, then the process advances to step S352. In step S352, the line-based synthesis filter unit 213 obtains the coefficient data from the buffer 212.

In step S353, the line-based synthesis filter unit 213 performs the synthesis filtering process for the obtained coefficient data to generate baseband image data. In step S354, the inverse DC-level shift unit 473 inversely shifts the DC-levels of the baseband image data.

In step S355, the inverse DC-level shift unit 473 supplies the resulted image data to the buffer 122, where they are stored. If the process of step S355 is terminated, the inverse wavelet transform process is completed.

Next, an exemplary process flow of the wavelet transform executed by the control of step S124 of FIG. 16 will be described with reference to the flowchart of FIG. 30.

As the wavelet transform process is initiated, in step S371, the line block defining unit 481 defines the line block size. In step S372, the code block defining unit 482 defines the code block size. In step S373, the precinct defining unit 483 defines the precinct size.

In step S374, the DC-level shift unit 491 obtains the target line block from the buffer 122. In step S375, the DC-level shift unit 491 shifts the DC-level of the obtained line block.

In step S376, the line-based analysis filter unit 311 performs analysis filtering for the target line block. In step S377, the line-based analysis filter unit 311 supplies the results of the analysis filtering process to the buffer 312, where they are stored.

As the process of step S377 is terminated, the wavelet transform process is terminated.

Figure 31:
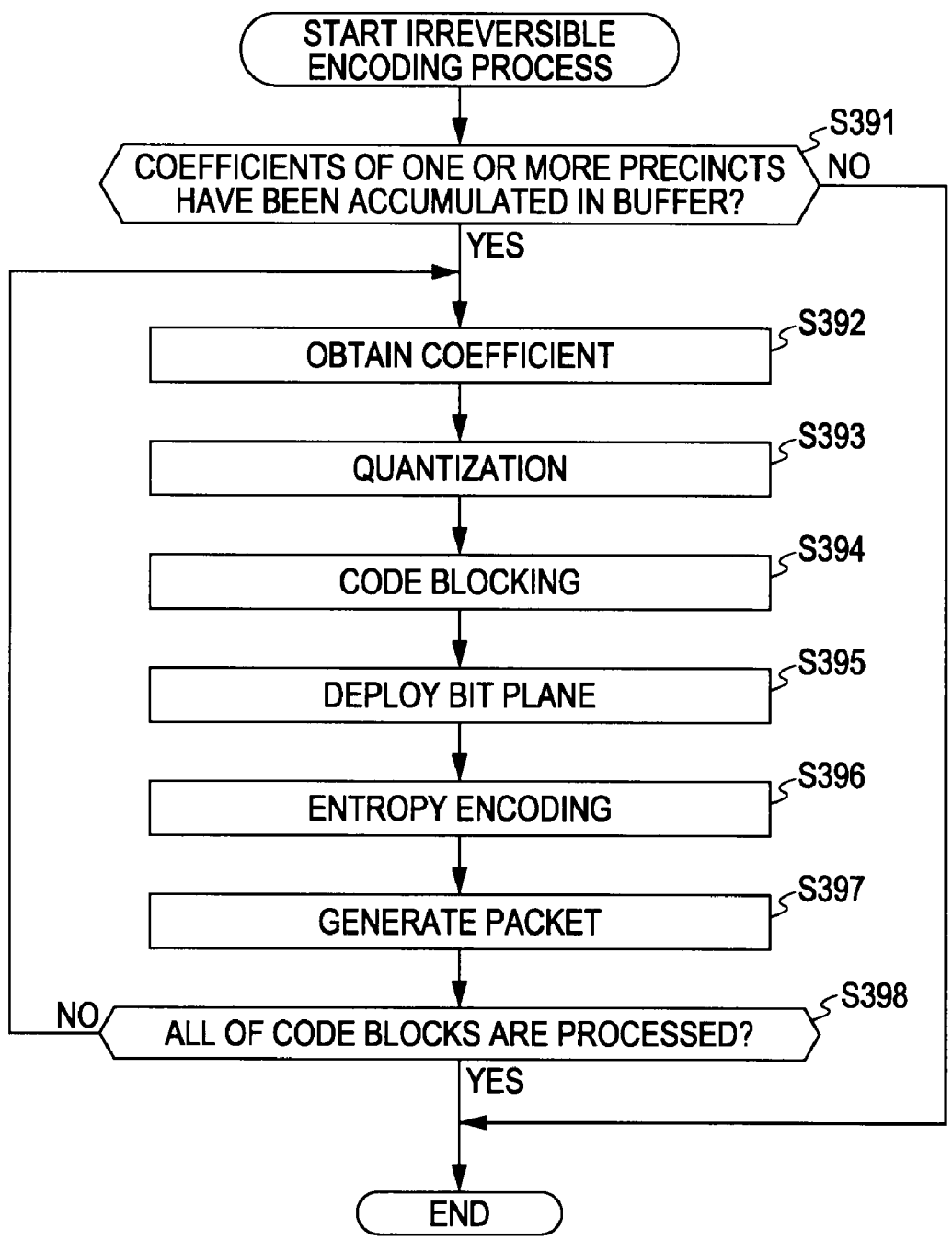
FIG. 31 is a flowchart illustrating an example of an irreversible encoding process flow.

Next, an exemplary process flow of the irreversible encoding executed by the control of step S125 of FIG. 16 will be described with reference to the flowchart of FIG. 31.

As the irreversible encoding process is initiated, in step S391, it is determined whether or not coefficients corresponding to one or more precincts have been accumulated in the buffer 312. If it is determined that they have been accumulated in the buffer 312, then the process advances to step S392.

In step S392, the quantization unit 331 obtains coefficients from the buffer 312. In step S393, the quantization unit 331 quantizes the obtained coefficients. In step S394, the code blocking unit 492 performs code blocking for the quantized coefficient data. In step S395, the bit-plane deployment unit 493 deploys coefficient data of each code block on a bit-plane.

In step S396, the EBCOT unit 332 performs entropy encoding for the coefficient data deployed on the bit-plane to generate code streams. In step S397, the header generating unit 333 and the packet generating unit 334 packetize the code streams.

In step S398, the irreversible encoding control unit 302 determines whether or not all the code blocks have been processed. If it is determined that any unprocessed code block exists, the process returns to step S392, and the subsequent processes are iterated. If it is determined in step S398 that all the code blocks have been processed, then the irreversible encoding process is terminated. If it is determined in step S391 that coefficients corresponding to one or more precincts are not accumulated in the buffer 312, then the irreversible encoding process is terminated.

Figure 29:
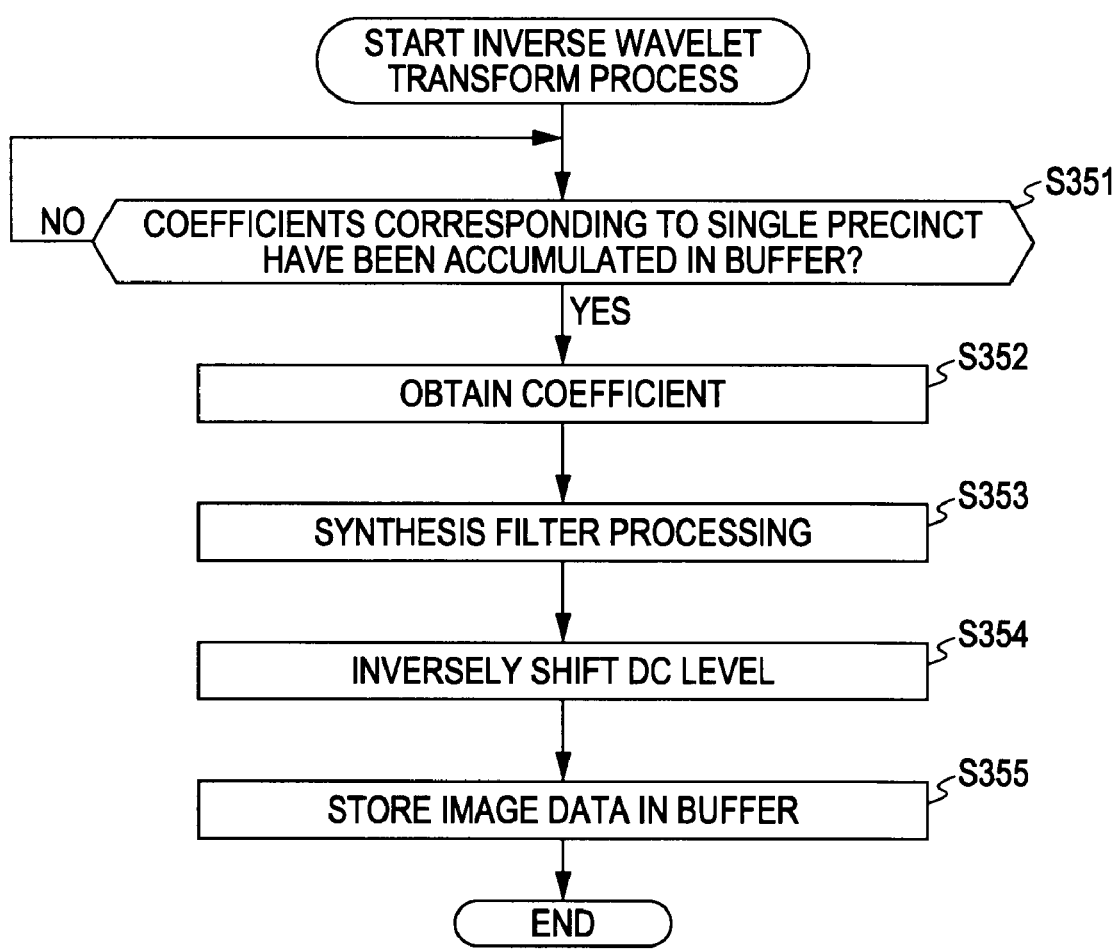
FIG. 29 is a flowchart illustrating an example of an inverse wavelet transform process flow.
Figure 30:
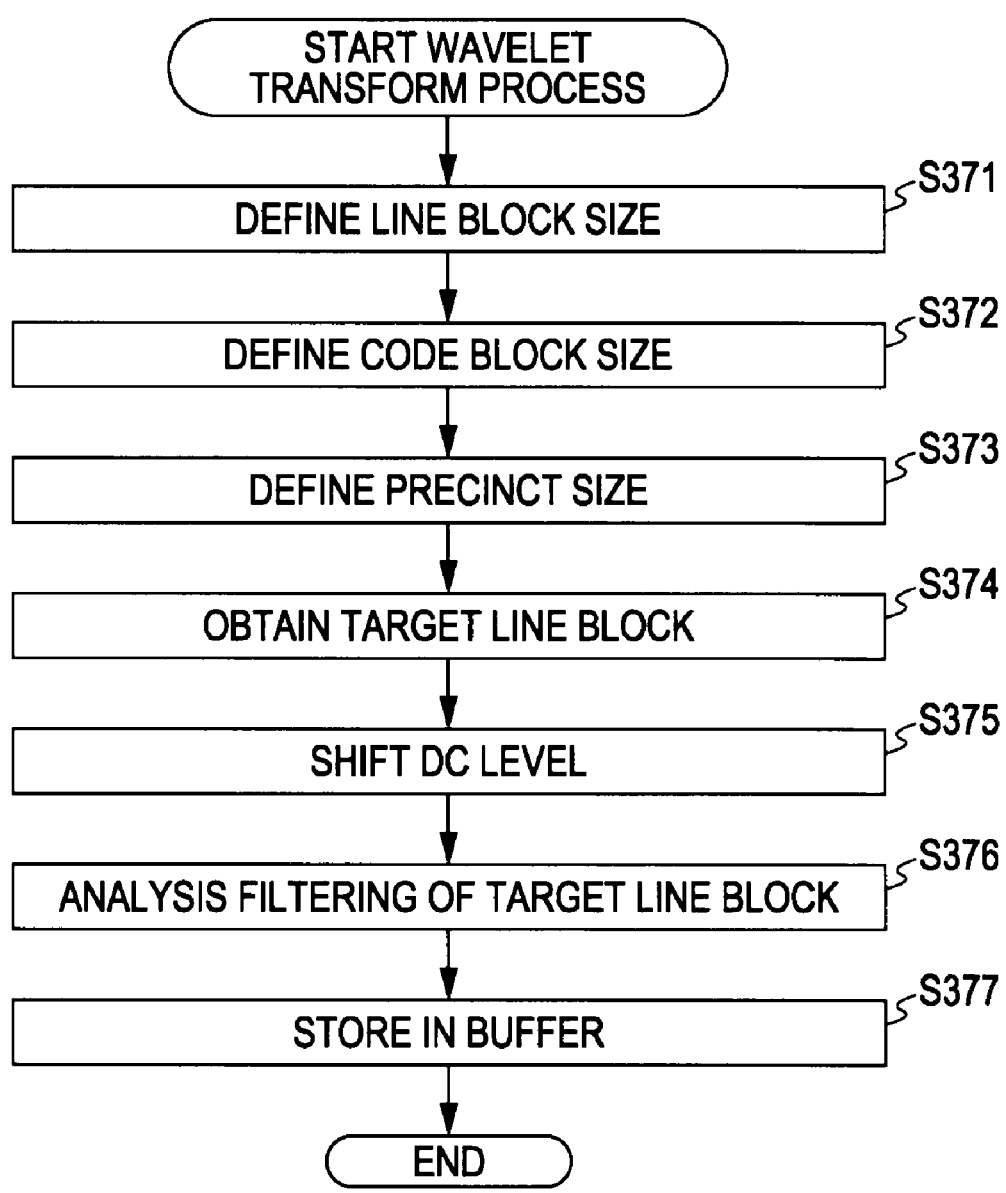
FIG. 30 is a flowchart illustrating an example of a wavelet transform process flow.

As described above, even when the JPEG2000 is employed as the encoding scheme, the inverse wavelet transform process described in conjunction with FIG. 29 and the wavelet transform process described in conjunction with FIG. 30 are concurrently (independently) executed by the control of the control unit 111 for the transcoding control process described in conjunction with the flowchart of FIG. 15.

In this case, the control unit 111 executes the wavelet transform process as soon as the image data generated by the inverse wavelet transform process are stored in the buffer 122 as much as a requisite minimum amount. Therefore, the encoding device 100 can reduce the memory capacity demanded in the buffer 122.

Figure 27:
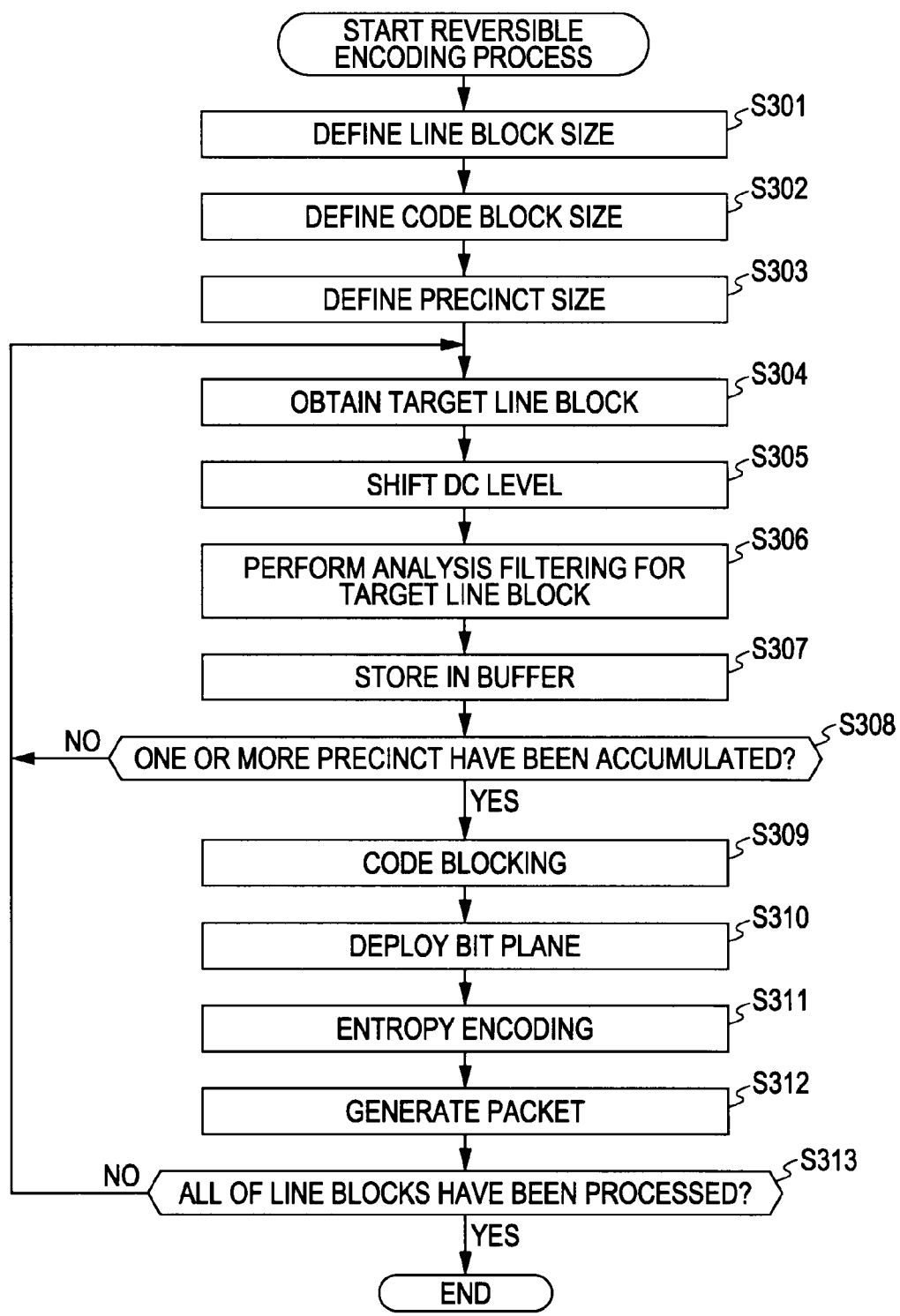
FIG. 27 is a flowchart illustrating an example of a reversible encoding process flow.
Figure 32:
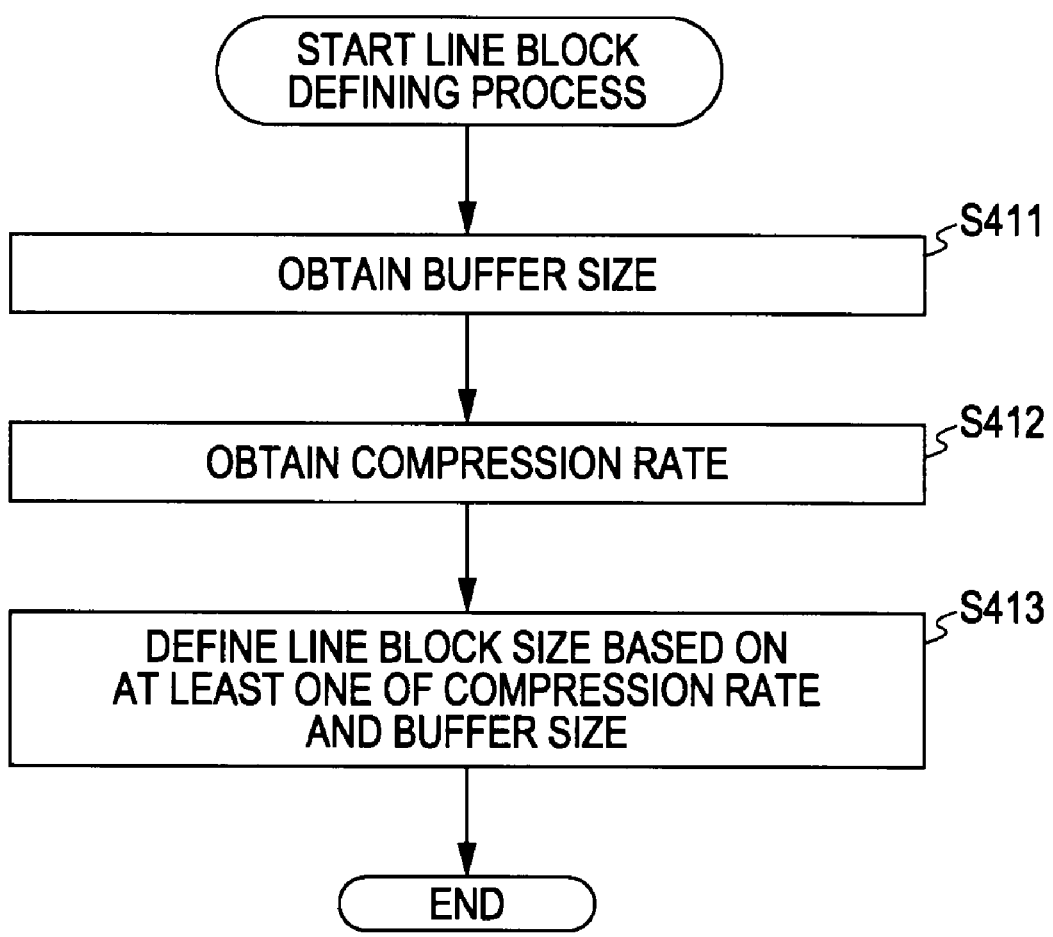
FIG. 32 is a flowchart illustrating an example of a line block size defining process flow.

Next, an exemplary flow of the process of defining the line block size executed, for example, in step S301 of FIG. 27, step S371 of FIG. 30, or the like will be described with reference to FIG. 32. Here, a case where the process is executed by the reversible line-based encoding unit 101 will be described. Since the process is similarly executed by the irreversible line-based encoding unit 123, a description thereof will be omitted.

As a process of defining the line block size is initiated, in step S411, the line block defining unit 421 obtains a capacity of the buffer 122 (i.e., a buffer size). In step S412, the line block defining unit 421 obtains the compression rate of the entropy encoding executed by the reversible encoding unit 413. In step S413, the line block defining unit 421 defines the line block size based on at least one of the buffer size or the compression rate.

If the process of step S413 is terminated, the process of defining the line block size is terminated.

As described above, by defining the line block size according to the memory size or the compression rate, it is possible to allow the line block to have an appropriate size and prevent an unnecessary load from being increased or the compression rate from being reduced.

As described above, when the JPEG2000 compression code stream that has been already encoded is transcoded to the JPEG2000 code stream, for example, if the first encoding of the compression code stream is lossless (reversible), and the subsequent encoding is lossy (irreversible), different filters are used. Therefore, it may be necessary to restore the baseband image once. In this case, if the encoding is executed again after all the pixels corresponding to a single picture are decoded, a significant memory amount is demanded. In this regard, according to an embodiment of the invention, it is possible to concurrently execute the line-based encoding while the line-based decoding is executed at the same time. Therefore, it is possible to execute both the decoding and the encoding with a small memory size.

In addition, since both the decoder and the encoder can be operated at the same time, it is possible to achieve a high-speed operation in which both the encoding and the decoding are completed within a short time.

The present invention has been made to restore a baseband once by decoding a certain encoded code stream and then execute encoding again to transform it to the encoded code stream while reducing memory consumption. As a specific application, a JPEG2000 reversible compression file is transformed to a JPEG2000 irreversible compression file while saving memory.

A transcoding device and method according to an embodiment of the present invention includes: an entropy encoding unit configured to receive an encoded code stream of an image signal and perform entropy decoding on a line or block basis for a line block of subbands obtained by band division; a synthesis filtering unit configured to execute synthesis filtering in horizontal and vertical directions for a result of the entropy decoding to output a baseband image on a line basis; an analysis filtering unit configured to execute analysis filtering in horizontal and vertical directions for the baseband image up to a predetermined resolution level number; and an entropy decoding unit configured to immediately execute entropy encoding as soon as the number of coefficients generated as a result of the filtering reaches a sample number allowed to perform entropy encoding within each subband.

Configuration of Personal Computer

A series of the processes described above may be executed by either hardware or software or in a combination thereof. When a series of the processes is executed by software, a program constituting the software is installed from a program recording medium to a computer embedded in dedicated hardware or a general-purpose personal computer enabled to execute a variety of functions by installing a variety of programs.

FIG. 33 is a block diagram illustrating an exemplary hardware configuration of a computer 500 executing a series of the processes described above based on a program.

A CPU (Central Processing Unit) 501, a ROM (Read Only Memory) 502, and a RAM (Random Access Memory) 503 are interconnected via a bus 504.

Further, an input/output interface 510 is connected to the bus 504. The input/output interface 510 is connected to an input unit 511 such as a keyboard, a mouse, and a microphone, an output unit 512 such as a display and a loudspeaker, a storage unit 513 such as a hard disk or nonvolatile memory, a communication unit 514 such as a network interface, and a drive 515 for driving a removable medium 521 such as an optical disk or a semiconductor memory.

The CPU 501 in the computer 500 configured as described above executes a series of the processes described above by loading a program stored in the storage unit 513 into the RAM 503 via the input/output interface 510 and the bus 504 and executing it.

The program executed by the CPU 501 is recorded on, e.g., a remote medium 521 or transferred in a wireless fashion or a wired fashion via a local area network, the Internet, or a so-called digital broadcasting, and installed to the storage unit 513.

Furthermore, the program executed by the computer may be a program processed in a time sequential manner in the order discussed herein. Alternatively, the program may be processed in parallel or at any necessary timing when it is called.

In the present specification, the steps describing the program stored in a recording medium are not necessarily processed in a time sequential manner in the order described herein but also may be processed in parallel or individually.

In the present specification, a system means the entire apparatus including a plurality of devices (or apparatuses).

The present application contains subject matter related to that disclosed in Japanese Priority Patent Application JP 2009-092613 filed in the Japan Patent Office on Apr. 7, 2009, the entire content of which is hereby incorporated by reference.

The element described herein as a single apparatus (or a processing unit) may be divided into a plurality of apparatuses (or processing units). Conversely, the elements described herein as a plurality of apparatuses (or processing units) may be integrated into a single apparatus (or a processing unit). Further, any element other than those described herein may be added to the configuration of each apparatus (or a processing unit). A part of the elements in any apparatus (or a processing unit) may be also included in other apparatuses (or other processing units) if the configuration or operation thereof in a system as a whole is substantially the same. It should be understood by those skilled in the art that the embodiments of the present invention are not intended to limit the scope of the invention, but may be variously changed or modified without departing from the spirit of the present invention.

What is claimed is:

1. An information processing apparatus comprising:
    synthesis filter means for executing synthesis filtering for coefficient data of each subband, obtained by decoding a code stream of a reversibly-encoded image and performing band division, in each predetermined number of lines or in each predetermined block to obtain baseband image data on a line basis;
    storage means for storing the baseband image data obtained by the synthesis filter unit;
    analysis filter means for reading the baseband image data stored in the storage unit and executing analysis filtering for the image data to divide the band of the image data up to a predetermined division level; and
    control means for controlling the analysis filter means to execute analysis filtering as soon as the amount of the baseband image data stored in the storage means reaches a data amount allowing analysis filtering.

2. The information processing apparatus according to claim 1, further including:
    decoding means for decoding the code stream of a reversibly-encoded image; and
    encoding means for encoding coefficient data of each subband obtained by the analysis filtering and band division.

3. The information processing apparatus according to claim 1, wherein the predetermined number of lines which is a processing unit of synthesis filtering is necessary to generate at least one line of the baseband image data obtained by the synthesis filter means.

4. The information processing apparatus according to claim 1, wherein the data amount allowing analysis filtering is the number of lines demanded for generating at least one lines of a lowest frequency subband of the coefficient data obtained by the analysis filtering and the band division.

5. The information processing apparatus according to claim 1,
wherein the synthesis filter means performs the synthesis filtering first in the horizontal direction for the coefficient data of each subband and then performs synthesis filtering in the vertical direction, and
wherein the analysis filter means performs the analysis filtering first in the horizontal direction for the coefficient data of each subband and then performs analysis filtering in the vertical direction.

6. The information processing apparatus according to claim 1,
wherein the synthesis filter means performs synthesis filtering first in the vertical direction for the coefficient data of each subband and then performs synthesis filtering in the horizontal direction, and
wherein the analysis filter means performs analysis filtering first in the vertical direction for the coefficient data of each subband and then performs analysis filtering in the horizontal direction.

7. The information processing apparatus according to claim 1,
wherein the decoding means decodes the code stream using a JPEG2000 decoding scheme, and
wherein the encoding means encodes the coefficient data using a JPEG2000 encoding scheme.

8. The information processing apparatus according to claim 1, further including defining means for defining processing unit of the synthesis filtering in the synthesis filter means.

9. The information processing apparatus according to claim 8, wherein the defining means defines processing unit of the synthesis filtering based on at least one of a compression rate of the encoding by the encoding means or a capacity of the storage means.

10. The information processing apparatus according to claim 1, further including:
blocking defining means for defining the size of a block which is processing unit of the encoding by the encoding means; and
precinct defining means for defining the size of a precinct including a plurality of the blocks of which the size is defined by the block defining means.

11. The information processing apparatus according to claim 1, where an area where a line group which is processing unit of the synthesis filtering is ranged out of the precinct defined by the precinct defining means is stuffed as soon as subsequent data of the line group are obtained.

12. An information processing method comprising the steps of:
executing synthesis filtering for coefficient data of each subband, obtained by decoding a code stream of a reversibly-encoded image and performing band division, in each predetermined number of lines or in each predetermined block to obtain baseband image data on a line basis;
storing the baseband image data obtained by the synthesis filter unit;
reading the baseband image data stored in the storage unit and executing analysis filtering for the image data to divide the band of the image data up to a predetermined division level; and
controlling the analysis filter unit to execute the analysis filtering as soon as the amount of the baseband image data stored in the storage unit reaches a data amount allowing analysis filtering.

13. An information processing apparatus comprising:
a synthesis filter unit configured to execute synthesis filtering for coefficient data of each subband, obtained by decoding a code stream of a reversibly-encoded image and performing band division, in each predetermined number of lines or in each predetermined block to obtain baseband image data on a line basis;
a storage unit configured to store the baseband image data obtained by the synthesis filter unit;
an analysis filter unit configured to read the baseband image data stored in the storage unit and execute analysis filtering for the image data to divide the band of the image data up to a predetermined division level; and
a control unit configured to control the analysis filter unit to execute analysis filtering as soon as the amount of the baseband image data stored in the storage unit reaches a data amount allowing analysis filtering.

* * * * *